(12) United States Patent
Nakajima

(10) Patent No.: US 8,126,294 B2
(45) Date of Patent: Feb. 28, 2012

(54) VIDEO STRUCTURING DEVICE

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/111,551

(22) Filed: May 19, 2011

(65) Prior Publication Data

US 2011/0217026 A1 Sep. 8, 2011

Related U.S. Application Data

(62) Division of application No. 11/793,807, filed as application No. PCT/JP2005/023748 on Dec. 26, 2005, now Pat. No. 7,949,207.

(30) Foreign Application Priority Data

Dec. 24, 2004 (JP) ................................. 2004-374715

(51) Int. Cl.
*G06K 9/54* (2006.01)
*G06F 17/00* (2006.01)
*H04N 5/66* (2006.01)

(52) U.S. Cl. .......................... 382/305; 707/705; 348/739

(58) Field of Classification Search .................. 382/182, 382/189, 190, 229, 305, 312; 348/207.99, 348/642, 739; 707/602, 705, 711, 741; 345/156, 345/204; 715/719–724; 386/206, 210, 218, 386/219, 235, 239, 314, 326
See application file for complete search history.

(56) References Cited

U.S. PATENT DOCUMENTS

| 5,450,134 | A | 9/1995 | Legate | |
|---|---|---|---|---|
| 5,940,846 | A | 8/1999 | Akiyama | |
| 6,041,323 | A | 3/2000 | Kubota | |
| 6,281,940 | B1 | 8/2001 | Sciammarella | |
| 6,415,303 | B1 * | 7/2002 | Meier et al. | 715/202 |
| 7,203,366 | B2 * | 4/2007 | Miyatake et al. | 382/190 |
| 7,221,796 | B2 | 5/2007 | Nishiyama et al. | |
| 7,277,621 | B2 * | 10/2007 | Kunieda et al. | 386/281 |
| 2002/0085116 | A1 | 7/2002 | Kuwano et al. | |

FOREIGN PATENT DOCUMENTS

| JP | 03-141484 | | 6/1991 |
|---|---|---|---|
| JP | 04-032970 | | 2/1992 |
| JP | 07-192003 | | 7/1995 |
| JP | 11-167583 | | 6/1999 |
| JP | 2001-034709 | A | 2/2001 |
| JP | 2002-014973 | A | 1/2002 |
| JP | 2003-333265 | A | 11/2003 |
| JP | 2003-345809 | A | 12/2003 |
| JP | 2004-080587 | A | 3/2004 |

* cited by examiner

*Primary Examiner* — Kanjibhai Patel
(74) *Attorney, Agent, or Firm* — Foley & Lardner LLP

(57) ABSTRACT

A video structuring device includes: character string extraction means for determining whether or not a character string is present in a frame image, and if it determines that a character string is present, generating character string position information for the character string present in a character string present frame image in which the character string is present, and outputting the character string position information, frame identifying information for identifying the character string present frame image, and the character string present frame image; video information storage means for storing frame identifying information, character string present frame image and character string position information in an index file all associated with one another; and structure information presentation means for associating character string display in the form of an image which is produced by cutting an area where the character string is present based on the character string present frame image and character string position information stored in the index file and displaying them on display means.

1 Claim, 20 Drawing Sheets

| VIDEO IDENTIFYING INFORMATION : ABC . MPG | | | |
|---|---|---|---|
| TIME OF SHOOTING | NAME OF FRAME IMAGE FILE | CHARACTER STRING POSITION COORDINATE Pa | CHARACTER STRING POSITION COORDINATE Pb |
| 1:23:14'33 | ABC-01231433 . JPG | Pa101 (120, 400) | Pb101 (600, 450) |
| 2:54:04'67 | ABC-02540467 . JPG | Pa102 (20, 100) | Pb102 (120, 150) |
| ... | ... | ... | ... |
| ... | ... | ... | ... |

FIG. 4

INDEX FILE NAME : INDEX01.XML

| VIDEO IDENTIFYING INFORMATION | TIME OF SHOOTING | NAME OF FRAME IMAGE FILE | CHARACTER STRING POSITION COORDINATE Pa | CHARACTER STRING POSITION COORDINATE Pb |
|---|---|---|---|---|
| ABC.MPG | 1:23:14'33 | ABC-01231433.JPG | Pa101 (120, 400) | Pb101 (600, 450) |
| | 2:54:04'57 | ABC-02540467.JPG | Pa102 (20, 100) | Pb102 (120, 150) |
| | ... | ... | ... | ... |
| DEF.MPG | ... | ... | ... | ... |
| | ... | ... | ... | ... |

FIG. 5

| INDEX LIST DISPLAY ||||
|---|---|---|
| VIDEO IDENTIFYING INFORMATION | TIME OF SHOOTING | CHARACTER STRING DISPLAY (IMAGE) |
| ABC. MPG | 1:23:14'33<br>2:54:04'67<br>...<br>... | CHARACTER STRING CONTAINED IN VIDEO<br>CHARACTER STRING<br>...<br>... |
| DEF. MPG | ...<br>... | ...<br>... |

| INDEX FILE NAME : INDEX02.XML | | | | | | |
|---|---|---|---|---|---|---|
| VIDEO IDENTIFYING INFORMATION | TIME OF SHOOTING | NAME OF FRAME IMAGE FILE | CHARACTER STRING POSITION COORDINATE Pa | CHARACTER STRING POSITION COORDINATE Pb | RECOGNIZED CHARACTER STRING | RECOGNITION RELIABILITY (%) |
| ABC. MPG | 1:23:14'33 | ABC-01231433.JPG | Pa101 (120, 400) | Pb101 (600, 450) | CHARACTER STRING CONTAINED IN VIDEO | 40 |
| | 2:54:04'67 | ABC-02540467.JPG | Pa102 (20, 100) | Pb102 (120, 150) | CHARACTER STRING | 95 |
| | ... | ... | ... | ... | ... | ... |
| | ... | ... | ... | ... | ... | ... |
| DEF. MPG | ... | ... | ... | ... | ... | ... |
| | ... | ... | ... | ... | ... | ... |

FIG. 13

| INDEX LIST DISPLAY | | | |
|---|---|---|---|
| VIDEO IDENTIFYING INFORMATION | TIME OF SHOOTING | CHARACTER STRING DISPLAY (IMAGE) | RECOGNIZED CHARACTER STRING |
| ABC. MPG | 1:23:14'33 | CHARACTER STRING CONTAINED IN VIDEO  [CHARACTER STRING] | CHARACTER STRING CONTAINED IN VIDEO |
| | 2:54:04'67 | ⋮   ⋮ | CHARACTER STRING |
| | ⋮   ⋮ | ⋮   ⋮ | ⋮   ⋮ |
| DEF. MPG | ⋮   ⋮ | ⋮   ⋮ | ⋮   ⋮ |

122 — VIDEO IDENTIFYING INFORMATION
124 — TIME OF SHOOTING
126 — CHARACTER STRING DISPLAY (IMAGE)
138 — RECOGNIZED CHARACTER STRING
120 — INDEX LIST DISPLAY

FIG. 20

| VIDEO IDENTIFYING INFORMATION | TIME OF SHOOTING | CHARACTER STRING DISPLAY (IMAGE) | RECOGNIZED CHARACTER STRING |
|---|---|---|---|
| ABC . MPG | 1:23:14'33 | CHARACTER STRING CONTAINED IN VIDEO | CHARACTER STRING |
| | 2:54:04'67 | ⋮ ⋮ | ⋮ ⋮ |
| DEF . MPG | ⋮ ⋮ | ⋮ ⋮ | ⋮ ⋮ |

INDEX LIST DISPLAY 120
122 — VIDEO IDENTIFYING INFORMATION
124 — TIME OF SHOOTING
126 — CHARACTER STRING DISPLAY (IMAGE)
139 — CHARACTER STRING

VIDEO STRUCTURING DEVICE

CROSS-REFERENCE TO RELATED PATENT APPLICATIONS

This application is a divisional of application Ser. No. 11/793,807, filed Jun. 22, 2007 now U.S. Pat. No. 7,949,207, which is the National Stage of Application No. PCT/JP2005/023748 filed on Dec. 26, 2005, which is based upon and claims the benefit of priority from Japanese Patent Application No. 2004-374715, filed Dec. 24, 2004, the entire contents of which are incorporated herein by reference. This application claims only subject matter disclosed in the parent application and therefore presents no new matter.

TECHNICAL FIELD

The present invention relates to archiving and monitoring of videos as well as a method for presenting structure information on video contents, and more particularly, the present invention relates to a video structuring device and method for efficiently accessing a certain portion in a video.

RELATED ART

Along with the recent development of digital video technologies, a large amount of video has been accumulated in storage devices such as hard disks as moving picture files. As a moving picture file can contain images of many different time series it is generally difficult to search for desired video contents from a moving picture file.

As an example of a method for presenting structure information relating to video contents, a television signal recording/playback apparatus disclosed in JP-A-2004-080587 is known. This television signal recording/playback apparatus includes: a recording/playback unit for writing digital video signals which are digital television signals for each television program or reading out written digital video signals for each television program; a control unit for performing writing and reading processing of digital video signals; a thumbnail generation unit for generating a thumbnail image having a reduced screen size from a screen of at least one frame at any point within each television program out of digital video signals read out by the recording/playback unit; and a thumbnail composition unit for composing and outputting a thumbnail list screen from thumbnail images for individual programs generated by the thumbnail generation unit. The recording/playback unit has therein a thumbnail list area which stores the thumbnail list screen. The control unit generates a thumbnail image by means of the thumbnail generation unit each time digital video signals for one program is written to the recording/playback unit, and composes a thumbnail list screen from the generated thumbnail image of each program by means of the thumbnail composition unit, and stores the composed thumbnail list screen in the thumbnail list area. This television signal recording/playback apparatus produces a thumbnail image from the first one frame of a program, or from a screen of one or more frames at a certain point in time, such as a screen five minutes after the start of a program, by utilizing a timer and the like.

However, since the television signal recording/playback apparatus disclosed in JP-A-2004-080587 utilizes a plurality of frame images as thumbnails at certain time intervals or at the time of scene change, it does not always ensure that an index properly representing the contents of image content is structured being associated with a video source. Consequently, the television signal recording/playback apparatus has a problem of inefficient access to an image desired by a user because a specific portion of a video file required by the user is not likely to appear in an index.

As a method for recognizing telop (subtitle) characters in a video, JP-A-11-167583 discloses a method, in which a video is first fed to a video storage medium and to a telop character recognition and search terminal. On the image storage medium side, an image storage unit stores the video as well as ID information as at the point of accumulation of the video. On the telop character recognition and search terminal side, each processing for detecting a telop character display frame, extracting a telop character area, and recognizing telop characters is carried out. An index file storage unit stores the result of the telop character recognition and ID information as at the point of display of the telop characters as an index file. As the ID information, time information may be stored, for example, and as the result of telop character recognition, character codes may be outputted, for example. When the user enters character codes for his or her desired video on a video search information input/storage unit of the video search terminal from an interface, e.g., a WWW (world wide web) browser, the input character codes are searched for from index files stored in the index file storage unit of the telop character recognition and search terminal, and a video having corresponding ID information is retrieved from the video storage unit. As a result, the video thus retrieved will be displayed on a video display unit of the video search terminal, e.g., a computer display.

With the system based on JP-A-11-167583, however, telop characters contained in index files are likely to include misrecognitions because they are text information obtained from character recognition. Due to appearance of meaningless text information resulting from such misrecognitions in indices, the system has a problem of low search efficiency when the user selects a desired scene.

JP-A-2003-345809 discloses a database construction system that includes: an audio transcription device for transcribing news audio corresponding to a news video into character strings; a character recognition device for detecting a character appearance section in which a character string appears in the news video and recognizing the character string; a retrieval device for determining degree of similarity among words contained in the result of audio transcription that corresponds to the character appearance section detected by the character recognition device, and retrieving a passage similar to the character string recognized by the character recognition device from the result of audio transcription by utilizing the degree of similarity; and a registration device for registering in a database the recognition result from the character recognition device and a news video corresponding to the passage retrieved by the retrieval device by associated with each other. This database construction system uses all the words contained in telops recognized by the character recognition device or in character strings of CG captions to perform passage retrieval on transcription of news audio. By performing such passage retrieval, the database construction system reduces the risk of extracting an irrelevant sentence being affected by a thesaurus for one word and the risk of registering irrelevant news videos to the database. Since this database construction system provides a search result by passage, the context of the result is easy to understand and news video can be registered in the database in a manner that facilitates understanding of their context.

However, because character information that is not included in audio is not registered to the database, the database construction system of JP-A-2003-345809 has a problem of low search efficiency when the user selects a desired scene.

As an information management apparatus for managing image data, JP-A-2003-333265 discloses an information management apparatus that includes: an attribute extraction unit for receiving image data from outside and extracting attribute information of the image data from a predetermined portion of the image data; a notification destination storage unit for storing a notification destination to which notification information indicating the receipt of image data should be notified by associating it with attribute information in advance; a notification destination determination unit for extracting a notification destination from the notification destination storage unit using the attribute information extracted by the attribute extraction unit; and an output unit for notifying the notification destination extracted by the notification destination determination unit of the notification information. This information management apparatus can, upon receipt of external information from outside, output information indicative of the receipt of the external information to a notification destination to which the information should be provided. Here, the output unit extracts internal information from an internal information storage unit based on an internal information ID, and stores the internal information in an view information database based on the notification destination together with relevant information and image data. The output unit is also capable of transmitting notification information indicating that image data has been received to a user terminal based on a notification destination received from the notification destination determination unit, and sending an internal information ID received from an internal information search unit to the user terminal together with the notification information.

However, the information management apparatus disclosed by JP-A-2003-333265 has a problem of inefficient access to a specific portion of a video desired by the user because an index properly representing the contents of image content is not structured being associated with a video source.

As a method for clipping characters from an image, JP-A-3-141484 discloses a character clipping method that, when the number of characters included in a character string is known, optically reads the character string and clips out a partial screen which corresponds to one character from the image of the character string. This character clipping method extracts a one-dimensional serial feature from a character string image, and also defines a model function that can determine a character clipping position which corresponds to the number of characters and the one-dimensional serial feature. The method then non-linearly matches the one-dimensional serial feature with the model function, determines a character clipping position within the character string image which corresponds to the character clipping position of the model function from a non-linear correspondence function in the non-linear matching, and then clips out a partial image corresponding to one character from the character clipping position determined. This character clipping method can, when the number of characters included in a character string is given, clip out characters one by one from a character string image which has relatively large variation of character width and/or spacing or in which characters are in contact with each other, and do so with a relatively small number of parameters and in a simple way.

However, the character clipping apparatus of JP-A-3-141484 can have a problem of inefficient access to a specific portion of a video required by a user because an index properly representing the contents of image content is not structured being associated with a video source.

As a fast recognition and retrieval system, JP-A-2001-034709 discloses a fast recognition and retrieval system that generates a feature vector from an input character pattern, identifies the feature vector in accordance with a condition stored in each node of a decision tree prepared in advance, sequentially selects a child node in accordance with the result of the identification, and repeats this classification until it reaches the terminal node. This fast recognition and retrieval system includes generation means for generating a template of a multi-dimensional feature vector stored in a recognition dictionary from a set of patterns to which a predetermined correct answer category has been given; template dictionary storage means for storing a template generated by the generation means and a pattern that contributed to the generation of the template by associated with each other, subset generation means for classifying a set of currently targeted templates and patterns corresponding to each of the templates, and the occurrence frequency of a correct answer category into subsets, and outputting templates that belong to subsets as well as a threshold value for separation into a subset; hierarchy dictionary means for storing subsets of templates that are sequentially generated by the subset generation means by associated with a corresponding subset of templates prior to separation; decision tree classification means for receiving a hierarchy structure stored in the hierarchy dictionary storage means from the top level of the hierarchy to classify input patterns, and outputting a child node which is result of the classification; and category determination means for reading out feature quantities effective for determining a template from leaf nodes of the hierarchy structure and performing major classification by use of the feature quantities. The subset generation means generates a decision tree by including a category that exists across a defined threshold value into subsets on both sides of the threshold value. This fast recognition and retrieval system can perform a fast retrieval in a stable required time without accompanying backtrack by optimizing the classification method for determining a subsequent category in accordance with the distribution of templates belonging to the leaf nodes of the decision tree, and registering a template that exists across the boundary between subsets by including the template in both the nodes when generating a decision tree.

However, the fast recognition and retrieval system of JP-A-2001-034709 can have a problem of inefficient access to a specific portion of a video required by the user because an index properly representing the contents of image content is not structured being associated with a video source.

The patent documents cited herein are listed below, all of which are Japanese patent laid-open publications.

Patent Document 1: JP-A-2004-80587
Patent Document 2: JP-A-11-167583
Patent Document 3: JP-A-2003-345809
Patent Document 4: JP-A-2003-333265
Patent Document 5: JP-A-3-141484
Patent Document 6: JP-A-2001-034709

DISCLOSURE OF THE INVENTION

Problem to be Solved by the Invention

After all, the related techniques outlined above have such problems as inefficient access to an image required by a user, low search efficiency in selecting a desired scene by the user, and inefficient access to a specific portion of a video required by the user.

An object of the present invention is to provide a video structuring device and method that can structure a character string display which properly represents the contents of image content associating it with a video source and improve efficiency of access to a specific portion of a video required by the user.

Another object of the invention is to provide a video structuring device and method that enables efficient access to a video of interest by analyzing the contents of a video and presenting resulting structure information as an index list of character string displays.

Another object of the invention is to provide a video structuring device and method that can present an index which is less affected by misrecognitions included in the result of character recognition of a character string present in a video.

Another object of the invention is to provide a video structuring device and method that can display a character string display or a recognized character string that represents the contents of a video to a user as an index for picture location.

Another object of the invention is to provide a video structuring device and method that can display a character string display or a recognized character string that represents the contents of a video to a user as an index for picture location, and allows the user to enter information for selecting the character string display or the recognized character string to locate a specific picture and play back the video starting from a frame image identified by the selected character string display or the recognized character string.

Another object of the invention is to provide a video structuring device and method that can preferentially display a recognized character string to the user in accordance with a magnitude of the recognition reliability upon character recognition of the character string in a video, thereby allowing the user to utilize the display of a character string which represents the contents of the video more properly as an index for picture location.

Another object of the invention is to provide a video structuring device and method that can preferentially display a character string display in the form of an image to the user in accordance with smallness of the recognition reliability upon character recognition of the character string in a video, thereby allowing the user to utilize the display of a character string which represents the contents of the video more properly as an index for picture location.

Another object of the invention is to provide a video structuring device and method that can inform the user that a character string has appeared in a video such as when videos are sequentially supplied as input.

Another object of the invention is to provide a video structuring device and method that can inform the user that a predetermined character string has appeared in a video such as when videos are sequentially supplied as input.

Means for Solving the Problem

According to a first aspect of the invention, a video structuring device includes: video input means for receiving a video signal and outputting a frame image of a video and frame identifying information which identifies the frame image; character string extraction means for receiving the frame image and the frame identifying information from the video input means to determine whether or not a character string is present in the frame image, and if it determines that a character string is present in the frame image, generating character string position information for the character string present in the frame image as a character string present frame image, and outputting the character string position information, frame identifying information for identifying the character string present frame image and the character string present frame image; video information storage means for obtaining the frame identifying information, the character string present frame image and the character string position information from the character string extraction means, and storing the obtained pieces of information associated with one another in an index file; and structure information presentation means for reading out the index file from the video information storage means, cutting out an area in which a character string is present from the character string present frame image based on the character string position information, and displaying a character string display in the form of the cut-out image on display means being associated with frame identifying information for identifying the character string present frame image. In this video structuring device, the character string position information is constituted from the coordinate values of a character string, for example.

According to a second aspect of the invention, a video structuring device includes: video input means for receiving a video signal and outputting a frame image of a video, frame identifying information for identifying the frame image, and video data for the video signal; character string extraction means for receiving the frame image and the frame identifying information from the video input means to determine whether or not a character string is present in the frame image, and if it determines that a character string is present in the frame image, generating character string position information for the character string present in the frame image as a character string present frame image, and outputting the character string position information, frame identifying information for identifying the character string present frame image and the character string present frame image; structure information presentation means; video information storage means for obtaining the frame identifying information, the character string present frame image, and the character string position information from the character string extraction means to store them in an index file associated with one another, obtaining the video data and frame identifying information from the video input means to store them being associated with one another, and when the video information storage means obtains the frame identifying information from the structure information presentation means, reading out video data which is recorded being associated with the frame identifying information obtained from the structure information presentation means, and outputting video data starting from a frame image corresponding to the frame identifying information obtained from the structure information presentation means; and video playback means for obtaining video data outputted by the video information storage means and outputting the video data to display means for display. Here, the structure information presentation means reads out the index file from the video information storage means, cuts out an area in which a character string is present from the character string present frame image based on the character string position information, and outputs a character string display in the form of the cut-out image to the display means for display. When the user enters information for selecting the character string display, the structure information presentation means outputs frame identifying information associated with the selected character string display to the video information storage means.

According to a third aspect of the invention, a video structuring device includes: video input means for receiving a video signal and outputting a frame image of a video and frame identifying information which identifies the frame image; character string extraction means for receiving the frame image and the frame identifying information from the video input means to determine whether or not a character string is present in the frame image, and if it determines that a character string is present in the frame image, generating character string position information for the character string present in the frame image as a character string present frame image, and outputting the character string position information, frame identifying information for identifying the character string present frame image and the character string present frame image; character string recognition means for obtaining the frame identifying information, the character string present frame image and the character string position information from the character string extraction means, cutting out an area in which a character string is present from the character string present frame image based on the character string position information, applying character string recognition processing to the cut-out image to obtain a recognized character string in the form of character codes, and outputting the recognized character string, the frame identifying information, and the character string position information; video information storage means for obtaining the frame identifying information, the character string present frame image, and the character string position information from the character string extraction means, obtaining the recognized character string, the frame identifying information and the character string position information from the character string recognition means, and storing the obtained image and information in an index file being associated with one another; and structure information presentation means capable of reading out the index file from the video information storage means, cutting out an area in which a character string is present from the character string present frame image based on the character string position information, and displaying a character string display in the form of the cut-out image and the recognized character string on display means being associated with frame identifying information for identifying the character string present frame image.

According to a fourth aspect of the invention, a video structuring device includes: video input means for receiving a video signal and outputting a frame image of a video, frame identifying information for identifying the frame image, and video data for the video signal; character string extraction means for receiving the frame image and the frame identifying information from the video input means to determine whether or not a character string is present in the frame image, and if it determines that a character string is present in the frame image, generating character string position information for the character string present in the frame image as a character string present frame image, and outputting the character string position information, frame identifying information for identifying the character string present frame image, and the character string present frame image; character string recognition means for obtaining the frame identifying information, the character string present frame image, and the character string position information from the character string extraction means, cutting out an area in which a character string is present from the character string present frame image based on the character string position information, applying character string recognition processing to the cut-out image to obtain a recognized character string in the form of character codes, and outputting the recognized character string, the frame identifying information, and the character string position information; structure information presentation means; video information storage means for obtaining the frame identifying information, the character string present frame image and the character string position information from the character string extraction means, obtaining the recognized character string, the frame identifying information, and the character string position information from the character string recognition means, and storing the obtained image and information in an index file being associated with one another, storing the video data and the frame identifying information obtained from the video input means being associated with one another, and when the video information storage means obtains the frame identifying information from the structure information presentation means, reading out video data which is recorded being associated with the frame identifying information obtained from the structure information presentation means, and outputting video data starting from a frame image corresponding to the frame identifying information obtained from the structure information presentation means; and video playback means for obtaining video data outputted by the video information storage means and outputting the obtained video data to display means for display. Here, the structure information presentation means can read out the index file from the video information storage means, cut out an area in which the character string is present from the character string present frame image based on the character string position information, and output a character string display in the form of the cut-out image and the recognized character string to the display means for display. When the user enters information for selecting the displayed character string display or recognized character string, the structure information presentation means outputs frame identifying information associated with the selected character string display or recognized character string to the video information storage means.

In the present invention, the character string recognition means may calculate the recognition reliability for a character string and the video information storage means. The reliability of recognition may be a likelihood value for character recognition on individual characters in a character string image, or the inverse of the average of a distance value, for example. When the recognition reliability is calculated, the video information storage means stores the recognition reliability obtained from the character string recognition means being associated with said character string position information in the index file, and the structure information presentation means compares the recognition reliability with a predetermined threshold value. If it determines that the recognition reliability of character string recognition is greater than the predetermined threshold value, the structure information presentation means may not display a character string display in the form of an image and may output a recognized character string to the display means for display. Alternatively, if the structure information presentation means compares the recognition reliability with the predetermined threshold value and determines that the reliability of character string recognition is smaller than the threshold value, it may not display the recognized character string and may output a character string display in the form of an image to the display means for display. By selecting from the character string display or display of a recognized character string for preferential display in accordance with the recognition reliability in this way, the user can use the character string display or the recognized character string whichever represents the contents of a video more properly as an index for picture location.

Further, in the present invention, the structure information presentation means may have display means show information to the effect that a character string is present in a video on to be shown and/or have audio output means emit sound when it determines that new character string position information is present. By adopting such a construction, the user can learn that a character string has appeared in a video such as when videos are sequentially inputted and also utilize a character string display or a recognized character string that properly represents the contents of the video as an index for picture location.

According to a fifth aspect of the invention, a video structuring device includes: video input means for receiving a video signal and outputting a frame image of a video; character string extraction means for receiving the frame image from the video input means to determine whether a character string is present in the frame image, and if it determines that a character string is present in the frame image, outputting information to the effect that a character string is present; and structure information presentation means for having display means show information to the effect that a character string is present in a video on and/or having audio output means emit sound when the structure information presentation means obtains information to the effect that the character string is present from the character string extraction means.

According to a sixth aspect of the invention, a video structuring device includes: video input means for receiving a video signal and outputting a frame image of a video; character string extraction means for receiving the frame image from the video input means to determine whether or not a character string is present in the frame image, and if it determines that a character string is present in the frame image, generating character string position information for the character string present in a character string present frame image in which the character string is present, and outputting the character string position information; and structure information presentation means for having display means show information to the effect that a character string is present in the video on and/or having audio output means output sound when the structure information presentation means obtains the character string position information from the character string extraction means.

According to a seventh aspect of the invention, a video structuring device includes: video input means for receiving a video signal and outputting a frame image of a video and frame identifying information which identifies the frame image; character string extraction means for receiving the frame image from the video input means to determine whether or not a character string is present in the frame image, and if it determines that a character string is present in the frame image, outputting a character string present frame image in which the character string is present and character string position information for the character string present in the frame image; character string recognition means for obtaining the character string present frame image and the character string position information from the character string extraction means, cutting out an area in which a character string is present from the character string present frame image based on the character string position information, applying character string recognition processing to the cutout image to obtain a recognized character string in the form of character codes, and outputting the recognized character string and the character string position information; and structure information presentation means for obtaining the recognized character string from the character string recognition means, determining whether or not the obtained recognized character string is a character string included in a group of predetermined keywords, and if it determines that the obtained recognized character string is a character string included in the predetermined keywords, having display means show information to the effect that a character string is present in the video and/or having audio output means emit sound. Adoption of such a configuration enables the user to learn that a predetermined character string has appeared in a video such as when videos are sequentially inputted.

According to the invention, since an index such as a character string display or a recognized character string properly representing the contents of video content is presented being associated with video data (or a video source), the user can efficiently access a specific portion of a video he or she requires. For most video content, character information appearing in a video is likely to properly reflect the contents of the video and the user is enabled to efficiently access a required portion of a video by associating an index which is generated at the time of appearance of character information with video data. Even when character information irrelevant to the contents of a video, such as "breaking news," is contained in a video, the user can promptly decide whether or not to view a portion of the video corresponding to the "breaking news" by seeing an index in the form of character string display.

According to the invention, even in a case where character information appearing in a video is automatically recognized to obtain character codes and a resulting recognized character string is utilized as an index, display can be switched between character string display in the form of an image and display of a recognized character string based on the recognition reliability of the recognized character string. Consequently, a specific portion of a video can be accessed more reliably and a video can be searched with improved efficiency, which can reduce the user's burden of selecting operations.

Furthermore, according to the invention, the user can learn that a character string has appeared in a video even when videos are sequentially inputted. In addition, when being notified that a new character string has appeared in a video, the user can enter information for selecting the display of that character string or a recognized character string to play back and view a video starting from a frame image corresponding to the selected character string display or recognized character string.

According to the invention, the user can utilize a character string display or a recognized character string that properly represents the contents of a video as an index for picture location, and can find a desired picture location of the video by selecting such character string display or recognized character string properly representing the contents of the video.

BRIEF DESCRIPTION OF THE DRAWINGS

FIG. 4 is a view showing an example of index information outputted by a character string extraction unit based on the video file shown in FIG. 3;

FIG. 5 is a view showing an example of the contents of a first index file that contains the index information shown in FIG. 4;

FIG. 6 a view showing an example of index list display;

FIG. 12 is a view showing an example of the contents of a second index file;

FIG. 13 is a view showing an example of index list display;

FIG. 20 is a view showing another example of the index list display.

DESCRIPTION OF SYMBOLS

10 Video structuring system;
12, 14 Imaging device;
16 Video database;
18, 22 Antenna;
20 Video output device;
24 Base station;
30 Communication network;
100, 200, 300, 400, 500, 600, 700, 800, 900 Video structuring device;
101, 102 Frame image;
103 Character string;
104, 105 Time of shooting;
106 Character string;
120 Title of index list display;
122 Video identifying information display field;
124 Frame identifying information;
126 Character string display;
128 Character string present frame image;
138, 139 Recognized character string;
170 Input device;
172 Display device;
210, 310, 410, 510, 610, 710, 810, 910 Video input unit;
212, 312, 412, 512, 612, 712, 812, 912 Character string extraction unit;
216, 316, 416, 516, 816, 916 Video information storage unit;
218, 318, 418, 518, 618, 718, 818, 918 Structure information presentation unit;
320, 520, 920 Video playback unit;
414, 514, 714, 814, 914 Character string recognition unit;
951 Image processing unit;
953 Compression/decompression unit;
955 Audio processing unit;
956 Audio output device;
957 Vocalization processing unit;
965, 968 Transmission/reception unit;
971 Input interface;
973 Display interface;
977 Recording medium;
978 Recording medium mounting unit;
979 Recording medium interface;
980 Information processing unit;
981 Memory;
984 Recording unit;
990 Calendar clock; and
999 Bus.

BEST MODE FOR CARRYING OUT THE INVENTION

Figure 1:
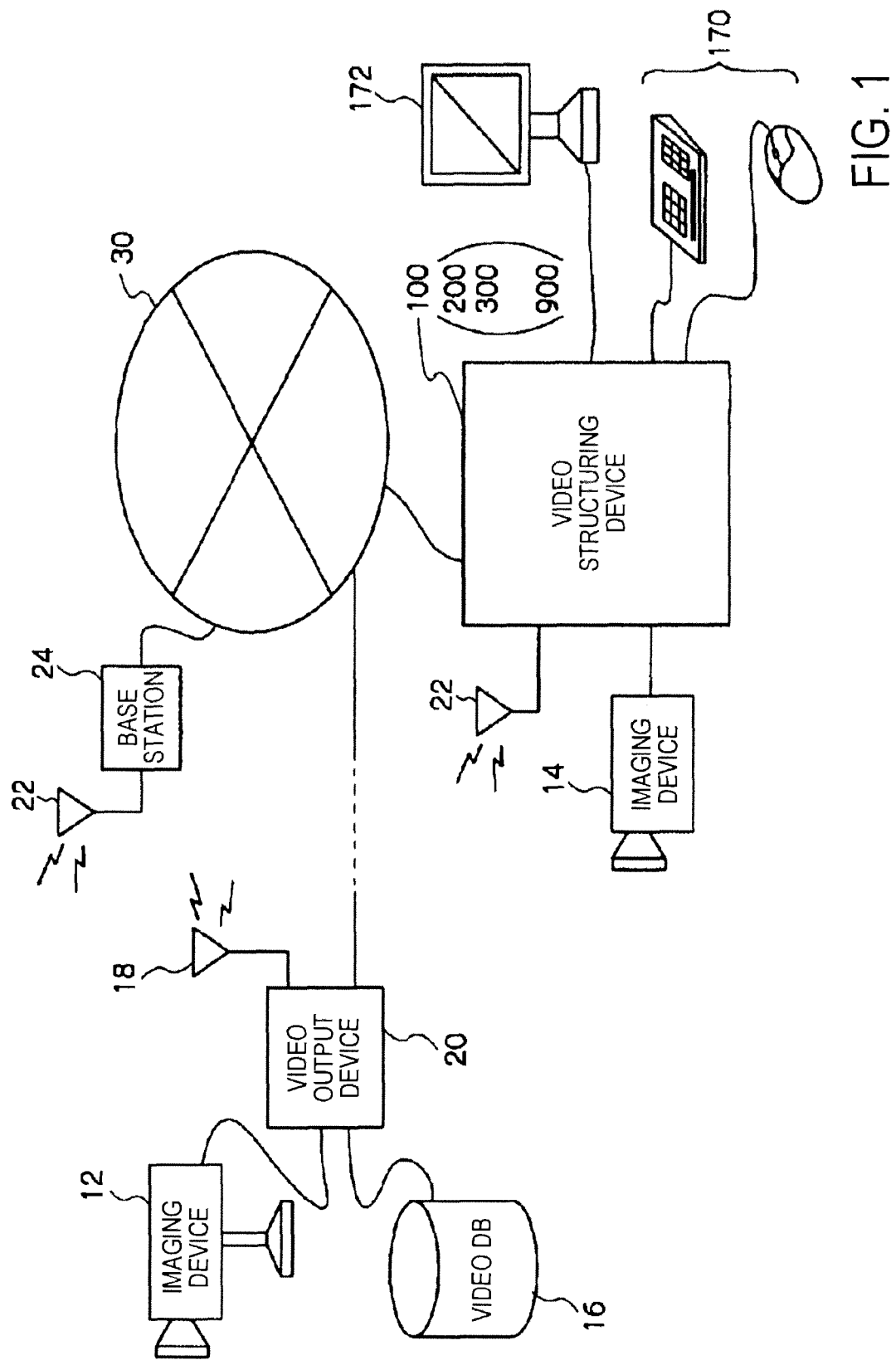
FIG. 1 is a block diagram showing an exemplary configuration of a video structuring system that includes the video structuring device according to the invention.

FIG. 1 shows an exemplary configuration of a video structuring system that includes the video structuring device according to the present invention. The video structuring system includes imaging device 12 forming an image of a subject on a light receiving surface and performing photoelectric conversion of the image to output a video signal for the image; video output device 20 for converting the video signal for a taken image into video data for transmission and outputting the same to communication network 30, and video structuring device 100 according to the invention. The video structuring device may also be video structuring devices 200, 300, 400, 500, 600, 700, 800 and 900 according to the exemplary embodiments to be discussed below.

Video output device 20 is configured to be able to convert a video signal for a taken image into video data for wireless transmission, and transmit the video data to base station 24 and/or video structuring device 100 via antenna 18. Video output device 20 is also configured to be able to convert a video signal for a taken image into video data for recording and record the video data into video database 16. Video output device 20 is further configured to be able to read out video data recorded in video database 16, convert it into video data for transmission, and output the data to communication network 30. The video data may be composite video signals or the like. As communication network 30, a network for cable television may be utilized.

Video output device 20 also has the function of reading video data recorded in video database 16, converting the data into video data for wireless transmission, and transmitting the video data to base station 24 and/or video structuring device 100 via antennas 18, 22. Video output device 20 also has the function of receiving by use of antenna 18 or the like video data which is transmitted by base station 24 or video structuring device 100 using a wireless or wired communication means, and recording the data into video database 16.

Base station 24 has the function of receiving by use of antenna 22 video data outputted from antenna 18 of video output device 20, and converting the data into video data for wired transmission before outputting it to video structuring device 100 via communication network 30. Base station 24 also has the function of receiving video data and/or various information such as index information for video which is transmitted by video structuring device 100, and transmitting it to video output device 20 and/or a communication device (not shown) such as a mobile phone and a mobile terminal, via antenna 22.

Video structuring device 100 has the function of receiving a video signal outputted by imaging device 14 or video output device 20 via a video input unit or a video signal input unit, which will be described below, and extracting time-series frame images from the video signal, and generating index information that associates frame identifying information that identifies a frame image containing a character string portion, such as telops (subtitles), with character string position information that identifies the position of the character string with respect to the position or area of the character string portion within the frame image. The frame identifying information used herein includes time information, counter information, and page information, for example. Then, video structuring device 100 outputs the generated index information to another communication device via communication means, such as communication network 30 or wireless transmission. Imaging device 14 may also be capable of outputting audio signals by containing a microphone and the like.

Video structuring device 100 also has the function of recording generated index information to a recording unit provided in video structuring device 100, or a recording medium. Video structuring device 100 further has the function of extracting an image of a character string portion contained in a frame image based on frame identifying information and character string position information that identifies the position of the character string which are included in the generated index information, and generating display data for index list display. An image of a character string portion includes a character string display or a character string image. The display data is delivered from video structuring device 100 to display device 172, thereby enabling an index list display to be provided to the user.

On this video structuring system, when the user views index list display including character string display or character string images and selects a character string display or character string image desired by the user from input device 170, such as a keyboard and a mouse, an image file containing the frame image is retrieved based on frame identifying information or the like which is associated with the character string display or the like. As a result, the video structuring system can start playback from the position of the frame.

Figure 2:
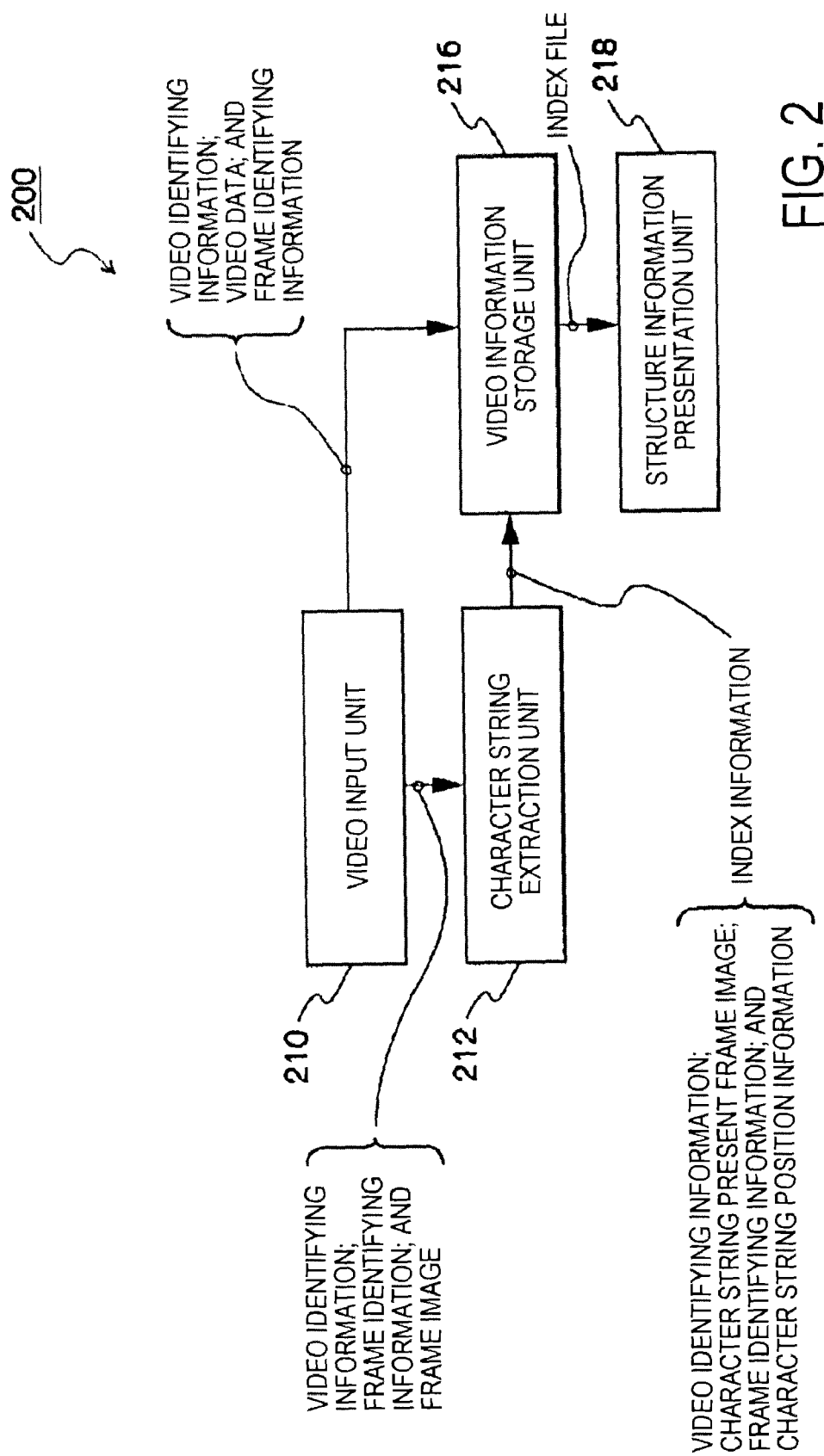
FIG. 2 is a block diagram showing the video structuring device according to a first exemplary embodiment.

FIG. 2 shows a video structuring device according to a first exemplary embodiment that has a similar configuration to the one described above. Video structuring device 200 shown in FIG. 2 includes: video unit 210 which, with input of digitalized video data or a video signal, outputs frame images or time-series frame images, frame identifying information for identifying the individual frame images, and video identifying information; character string extraction unit 212 to which frame images or time-series frame images are supplied from video input unit 210 and which determines whether or not any character string is present in the frame images, and when it determines that a character string is present, outputs frame identifying information for a character string present frame image in which the character string is present and character string position information such as coordinate values of the character string within the frame image; video information storage unit 216 which stores index information which associates the character string present frame image, character string position information and frame identifying information with each other as a first index file, and also stores video data; and structure information presenting unit 218 which retrieves the stored first index file, and outputs to display device 172 a frame image in which the character string is present or a character string image corresponding to character string position information. Here, the video signal includes RGB signal, composite video signal, or like signals.

With this configuration, video input unit 210 has the function of, upon receipt of digitalized video data, or a video signal such as RGB or composite video signal, outputting video identifying information that identifies the entire video, the digitalized video data, and frame identifying information which identifies frame images during playback of each frame image of the video data, to video information storage unit 216. Video input unit 210 also has the function of, when it receives such video data and/or video signal, generating frame images or time-series frame images from the input video signal, and also outputting video identifying information for identifying the entire video as well as individual frame images or time-series frame images to character string extraction unit 212 together with frame identifying information which identifies the individual frame images separately.

To character string extraction unit 212, video identifying information such as the name of a file in which a video is recorded or a program title, a frame image, and the second frame identifying information are entered from video input unit 210. Character string extraction unit 212 determines whether any character string is present in the input frame image. If it determines a character string is present in the input frame image, character string extraction unit 212 outputs the video identifying information, a character string present frame image, frame identifying information for identifying the specific frame image in which the character string is present, and character string position information for the character string within the frame image to video information storage unit 216 as index information. A character string present frame image refers to a frame image which is detected as containing a character string; however, it may also be a thumbnail image which is produced by reducing such a frame image in size as necessary. The character string position information may be coordinate values which indicate where in a frame image a detected character string is present, for example. Structure information presentation unit 218 presents character string display in the form of an image to the user based on index information thus obtained.

In this exemplary embodiment, any frame identifying information is for identifying individual frame images. As the frame identifying information, information on such as the time of shooting, frame image number, or counter information can be used. Time information for synchronized reproduction such as PTS (Presentation Time Stamp) and DTS (Decoding Time Stamp), or reference time information SCR (System Clock Reference) may be used as the time information.

Character string extraction unit 212 first receives video identifying information, a first frame image, and frame identifying information which identifies the individual frame images as input from video input unit 210, and determines whether or not any character string is present in the frame image. If it determines that a character string is present in the frame image, character string extraction unit 212 then outputs video identifying information for that video, a character string present frame image, frame identifying information for identifying the specific frame image in which the character string is present, and character string position information such as coordinate values of the character string within the frame image to video information storage unit 216 as first index information. Here, if the same character string is present in a number of frame images, the specific frame image in which the character string is present is preferably the first one of the frame images which include the same character string. If no character string is present in the frame images, character string extraction unit 212 does not output frame identifying information and character string position information.

Then, character string extraction unit 212 determines whether or not a character string is present in the second frame image. If it determines that a character string is present in the frame image, character string extraction unit 212 outputs frame identifying information for identifying the character string present frame image in which the character string is present and character string position information such as coordinate values of the character string within the frame image. Character string extraction unit 212 repeats this processing for each subsequent frame image in sequence.

Here, exemplary processing for extracting a character string performed by character string extraction unit 212 will be described. Character string extraction unit 212 first differentiates an input frame image to generate a differentiated image. Character string extraction unit 212 then binarizes each pixel value of the differentiated image with a predetermined threshold value, and projects a resulting binarized image in the horizontal and vertical directions to generate a histogram of pixels, thereby obtaining a projection pattern.

Next, character string extraction unit 212 defines a continuous area having the value of the projection pattern equal to or greater than a predetermined value as a character string candidate area. Here, it may omit any continuous area having a size smaller than a predetermined value from character string area candidates as noise. Then, by applying layout analysis processing to each of character string candidate areas determined based on projection patterns, final character string position information can be generated.

For layout analysis processing, a method like "Document layout analysis by extended split detection method" described in page 406 to 415 of the proceedings of "the IAPR Workshop on Document Analysis Systems" held in 1998 can be employed, for example. This layout analysis processing extracts image areas other than characters and performs area division with the position of the image areas as boundary to divide the areas into sub-areas. By recursively applying this process to the sub-areas, position information for a character string can be finally obtained, e.g., as coordinate values within the image.

Although it is conceivable that noise remains in character string candidate areas by over-extracting much noise other than characters from a background image, the noise is removed in the course of recursive processing as areas other than character strings by employing the layout analysis method described above. Consequently, the method described here can extract only character strings. Character string position information may be information representing the smallest rectangle that surrounds one character string or information representing a shape that is combination of a number of rectangles.

Figure 3:
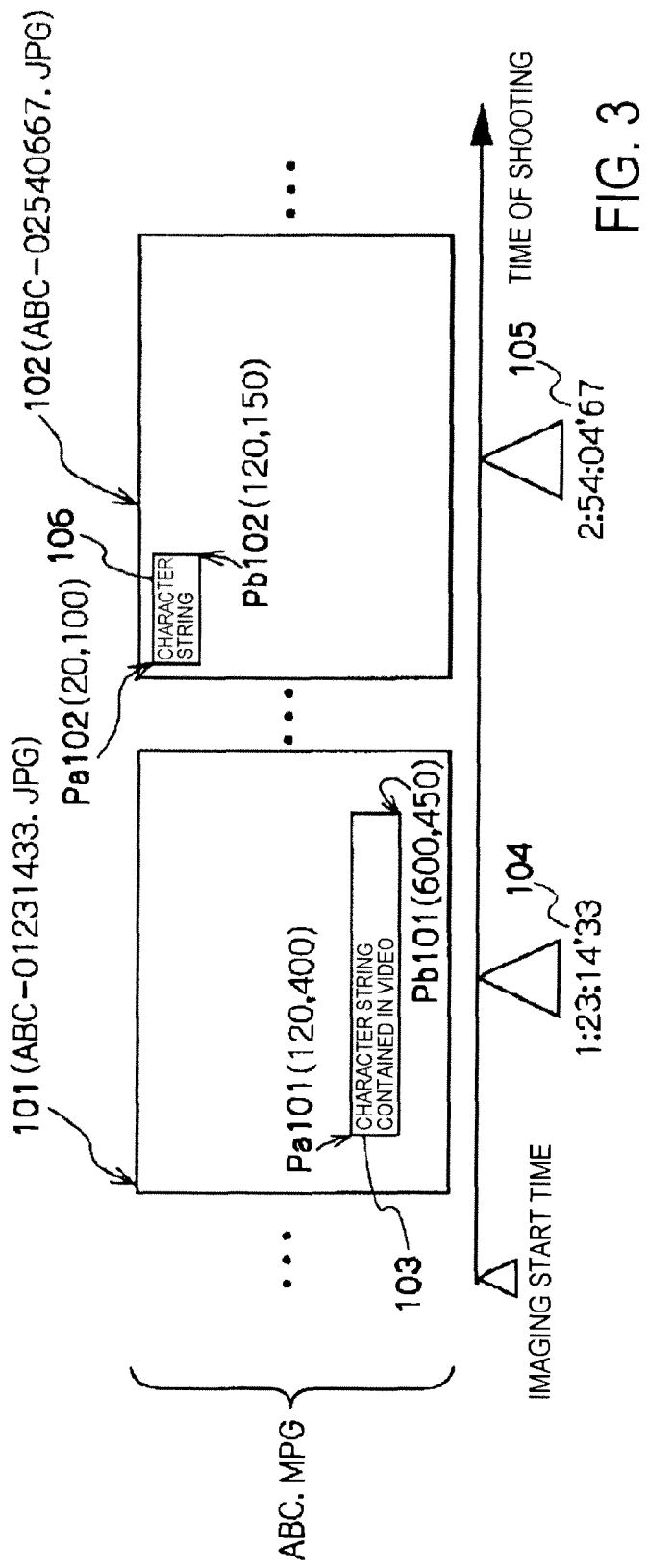
FIG. 3 is a view showing time-series frame images obtained by decoding a video file having video identifying information "ABC.MPG;"

FIG. 3 is a view showing time-series frame images that are obtained by decoding a video file with video identifying information of "ABC.MPG," for example, as well as character strings contained in the frame images.

Decoding of the video file "ABC.MPG" by video input unit 210 produces one or more frame images as shown in the figure. When a video signal such as RGB signal and YC signal (or composite signal) is supplied to video input unit 210, one or more frame images such as shown in FIG. 3 can also be obtained by digitizing the time-series frame images.

Character string extraction unit 212 receives video identifying information for the file "ABC.MPG," individual frame images, and frame identifying information which identifies these individual frame images from video input unit 210, and determines whether or not a character string is present in the frame images. Although the illustrated example uses a video file name as video identifying information, a program title from an electronic program guide (EPG) and the like may also be used. In the illustrated example, shooting time information is used as frame identifying information. In the following, processing performed in video structuring device 200 shown in FIG. 2 will be described with reference to a case where a series of frame images, such as shown in FIG. 3, is entered.

In this example, since character string 103 that reads "Character string contained in video" is present in frame image 101 of shooting time 104 (1:23:14'33), character string extraction unit 212 outputs video identifying information "ABC.MPG" that identifies the entire video, video data for frame image 101 which is reduced in size as required, frame identifying information for identifying character string present frame image 101 in which the character string is present, and character string position information which includes the coordinates Pa101 (120, 400) and Pb101 (600, 450) of the character string within the frame image, to video information storage unit 216 as index information. As the frame identifying information for identifying character string present frame image 101, a file name "ABC-01231433.JPG" can be used, for example.

The example shown in FIG. 3 uses a coordinate system with the upper left pixel of a frame image set as the origin as the coordinate system for character strings. Herein, the coordinate value of the upper left vertex of the smallest rectangle that surrounds a character string is defined as Pa and that of the lower right vertex of the rectangle as Pb.

Similarly, since there is character string 106 that reads "Character string" in frame image 102 of shooting time 105 (2:54:04'67), character string extraction unit 212 outputs video identifying information "ABC.MPG" which identifies the entire video, video data for frame image 102 which is reduced in size as necessary, frame identifying information for identifying character string present frame image 102, and character string position information which includes the coordinates Pa102 (20, 100) and Pb102 (120, 150) of the character string existing in the frame image to video information storage unit 216 as index information. As the frame identifying information, a file name "ABC-02540467.JPG" can be used, for example.

FIG. 4 shows an example of index information which is outputted by character string extraction unit 212 based on the video file shown in FIG. 3. As shown in FIG. 4, the index information outputted by character string extraction unit 212 includes video identifying information "ABC.MPG" which identifies the video file, frame identifying information which identifies a frame image in which a character string is present, and character string position information for the character string existing in the frame image. The frame identifying information may be a file name "ABC-01231433.JPG" or the like, for example, and the character string position information may be coordinates Pa101 (120, 400) and Pb101 (600, 450), or the like, for example.

Video information storage unit 216 stores, as a first index file, the first index information outputted by the character string extraction unit 212, which associates the video identifying information, the character string present frame image in which the character string is present, the frame identifying information that identifies the character string present frame image, and the character string position information with each other. Video information storage unit 216 also stores the video identifying information, video data and frame identifying information outputted by video input unit 210 as video data.

FIG. 5 is a view showing an example of the first index file containing the index information shown in FIG. 4.

As shown, in the first index file (INDEX01.XML), index information for other video files (e.g., "DEF.MPG") is also included in addition to one or more pieces of index information for the video file "ABC.MPG" shown in FIG. 4. The first index file is not limited to a file having a database structure by such as XML (extensible markup language), but may be a file of a file format for display such as HTML (hypertext markup language) or other file formats.

Structure information presentation unit 218 retrieves an index file stored by video information storage unit 216, generates index list display information, and outputs the information to display device 172. Display device 172 makes index list display as shown in FIG. 6 for notification to the user. FIG. 6 shows an example of index list display.

As shown in FIG. 6, the index list display indicates title 120 of the index list display, video identifying information display field 122 for identifying the video file, frame identifying information 124 such as the time of shooting for identifying a character string present frame image in which a character string is present, and character string display 126 in the form of an image which is created by cutting out an area in which the character string is present from a frame image by using the frame identifying information, video data for the frame image, and character string position information. Character string display 126 may be displayed in an order or at a position desired by the user. An index list may be displayed at time intervals desired by the user.

The user can select replay point information such as a desired character string display 126 and/or time of shooting by manipulating input device 170 such as a mouse and a keyboard. The replay point information is information indicating from where a video should be played back, being represented by frame identifying information. When the user selects desired character string display 126 or the like to designate a replay point of the video, the video file of the selected video identifying information is retrieved and a video starting from the frame image identified by corresponding frame identifying information 124 will be displayed on display device 172. The example shown here employs the time of shooting as replay point information.

Figure 7:
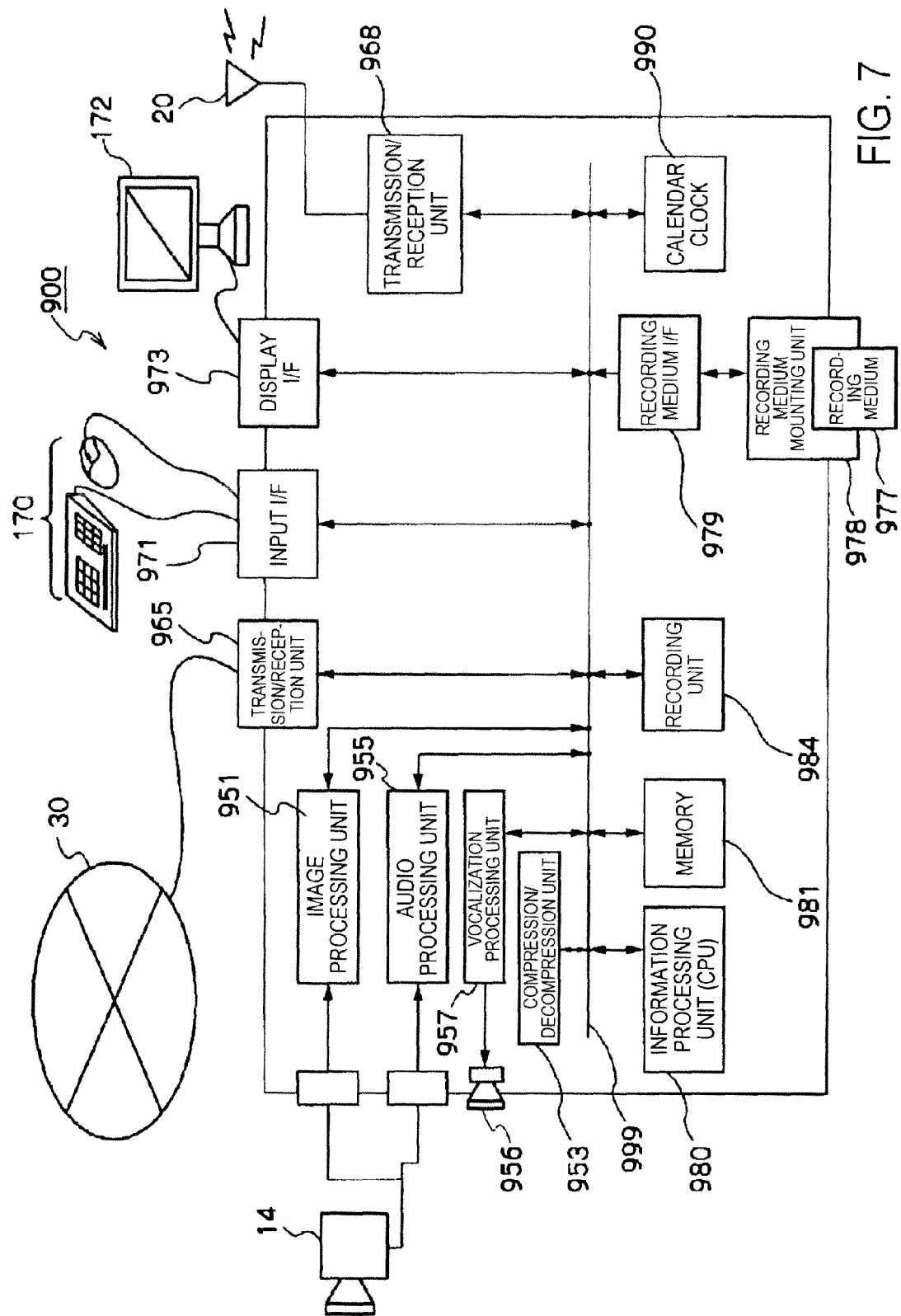
FIG. 7 is a block diagram showing a signal processing system of the video structuring device according to a second exemplary embodiment.

FIG. 7 shows the configuration of a signal processing system of the video structuring device according to a second exemplary embodiment. The video structuring device shown in FIG. 7 is realized by a program installed in a computer system controlling the hardware resources of the computer system. When the video structuring device receives a video as input and determines that a character string is present in a frame image of the input video, it can output, as index information, video identifying information for the video, a character string present frame image which can be reduced in size as necessary such as a thumbnail, frame identifying information which identifies the specific character string present frame image in which the character string is present, and character string position information such as coordinates values of the character string present in the frame image.

Video structuring device 950 receives video signals from imaging device 14 which forms a subject image on a light receiving surface and performing photoelectric conversion of the image to output a video signal for the image. Video structuring device 950 includes: image processing unit 951 for converting an input video signal into video data for recording, audio processing unit 955 to which audio signals collected by imaging device 14 are entered and which converts them into audio or video data for recording, transmission/reception unit 965 for inputting and outputting video data, audio data, or other various information from and to communication network 30, and antenna 20 and transmission/reception unit 968 for transmitting and receiving video data, audio data, or other various information to and from a radio communication network.

Video structuring device 950 also includes a compression/decompression unit 953, recording medium mounting unit 978, recording medium interface 979, input interface 971, display interface 973, information processing unit 980, memory 981, recording unit 984, and calendar clock 990.

Compression/decompression unit 953 performs compression control of a video and decompression control of a compressed video by a method represented by MPEG (motion picture expert group) for video or audio data. compression/decompression unit 953 also performs processing of compression control of an image and decompression control of a compressed image by a method represented by JPEG (joint picture expert group) for video data.

To recording media mounting unit 978, recording medium 977 can be removably mounted. Recording medium interface 979 is for recording and reading various information to and from recording medium 977. Recording medium 977 is a removable recording medium, such as a semiconductor medium like a memory card, an optical recording medium represented by DVD and CD, and a magnetic recording medium.

Input interface 971 transmits/receives information to and from input device 170, which may be a keyboard, a mouse and the like used for entering various instructions such as to start or finish index list display, select a video file, or select a character string display or a character string image. Display interface 973 outputs image signals for display to display device 172 which displays information such as images and characters.

Information processing unit 980 may be composed of a CPU, for example, and it performs such processing as input of video signals, generation of frame images or frame identifying information from video signals, determination of whether there is a character string in a frame image, generation of character string position information, association of various information, cutting out of an area in which a character string is present from a frame image, and other overall control of video structuring device 950. Memory 981 is used as a work area during program execution. Recording unit 984 is formed of a hard disk and the like for recording processing programs executed by the video structuring device 950 and various constants, as well as various information such as addresses for use in communication connection with communication devices on a network, dial-up telephone numbers, attribute information, URL (Uniform Resource Locators), gateway information, and DNS (Domain Name System). The calendar clock is for timing.

In video structuring device 950, information processing unit 980 is connected to peripheral circuits of the information processing unit by bus 999, which enables fast transfer of information among them. Information processing unit 980 can control the peripheral circuits based on instructions of processing programs running in information processing unit 980.

Video structuring device 950 may also be a dedicated apparatus having processing ability associated with structuring of video information. Alternatively, a generic processing device such as a video recorder, a video camera, a digital still camera, a mobile phone equipped with a camera, a PHS (Personal Handyphone System), a PDA (Personal Data Assistance or Personal Digital Assistant: mobile information and communication devices for personal use), and a personal computer may be used as video structuring device 950.

Here, image processing unit 951, transmission/reception units 965, 968, recording medium interface 979, recording unit 984 and so forth can each function as a video signal input unit, being capable of receiving digitalized video data, or video signals such as RGB signal and composite video signal. By incorporating television tuner functions to transmission/reception unit 968, video signals can also be supplied to video structuring device 950 from an external device.

Display device 172, which is a liquid crystal display device, a CRT (cathode-ray tube) or the like, is used for displaying various information such as character string images, recognized character strings, images, characters and index list display, for notification of such information to the user. Audio output device 956 such as is a speaker and the like, is used for conveying information indicating the presence of a character string within a video by voice to the user based on audio signals outputted by vocalization processing unit 957.

Information processing unit 980 has the functions of: generating, from an input video signal, frame images for the video and frame identifying information identifying the frame images; determining whether or not a character string is present in a generated frame image, and if it determines that a character string is present in the frame image, generating character string position information such as coordinate values of the character string present in the character string present frame image in which the character string is present; and generating a character string image by cutting out an area in which the character string is present from the character string present frame image based on the character string position information.

Next, processing performed by the video structuring device shown in FIG. 7 will be described using the flowchart of FIG. 8.

Processing being performed by information processing unit 980 of video structuring device 950 proceeds to "video structuring processing" (box S1200) when an instruction to start video structuring processing is entered by the user, or when a video signal is outputted from video output device 20, or when the time to start video structuring processing which is set in calendar clock 980 of video structuring device 950 has been reached, or when start of video structuring processing is otherwise instructed. Then, information processing unit 980 performs the process of waiting for transmission of a video signal from video output device 20 or imaging device 14.

At "video output processing" (box S1202), when video output device 20, imaging device 14 or the like outputs video signals with RGB, YC, MPEG, or other formats, image input unit 951, transmission/reception unit 965, 968 and so forth of video structuring device 950 receives the video signals at "video input processing" (box S1210), and outputs digitalized time-series video data to information processing unit 980, compression/decompression unit 953, memory 981 and so forth via bus 999.

When video signals such as RGB or YC signals are supplied from video output device 20, imaging device 14 or the like, RGB video signals, YC composite signals or like signals are supplied to image processing unit 951. Image processing unit 951 outputs digitalized time-series video data, along with frame identifying information which identifies frame images during playback of each frame image of the video data, to information processing unit 980, compression/decompression unit 953, memory 981 and so forth via bus 999. Similarly, when video output device 20 or imaging device 14 outputs audio signals, the audio signal is supplied to audio processing unit 955, which associates digitalized audio data with video data and outputs the data to information processing unit 980, compression/decompression unit 953, memory 981 and so forth via bus 999.

Next, information processing unit 980 adds video identifying information for identifying the entire video to the time-series image data outputted by image processing unit 951, and applies compression processing (or encoding processing) based on a standard such as MPEG to the time-series image data at compression/decompression unit 953. In this state, information processing unit 980 manages the video identifying information that identifies the entire video, digitalized time-series video data, and frame identifying information for identifying frame images during playback of each frame image of the video data, which are associated with each other. For the video identifying information for identifying the entire video, the name of a file in which the video is recorded or a program title can be used, for example.

On the other hand, when a video signal in MPEG or the like is entered from video output device 20 or imaging device 14, image processing unit 951 outputs the input video data to information processing unit 980, compression/decompression unit 953, memory 981 and so forth via bus 999. When video data encoded in MPEG or the like is entered from video output device 20, transmission/reception unit 965 or transmission/reception unit 968 outputs the input video data to information processing unit 980, compression/decompression unit 953, memory 981 and so forth via bus 999.

Then, information processing unit 980 transfers the obtained video data in MPEG or the like to compression/decompression unit 953 for decompression processing (or decoding processing) to obtain time-series image data. In this state, information processing unit 980 manages the video identifying information, time-series video data, and frame identifying information for identifying frame images during playback of each frame image of the video data, which are associated with each other. As in the above-described case, information on the time of shooting, or information such as frame image number or counter information may be used as frame identifying information for identifying individual frame images. For time information, time information for synchronized reproduction such as PTS (Presentation Time Stamp) and DTS (Decoding Time Stamp), or reference time information SCR (System Clock Reference) can be used.

In the following "character string extraction processing" (box S1212), information processing unit 980 receives video identifying information, the first frame image, and frame identifying information for identifying the individual frame images from memory 981 or compression/decompression unit 953 via bus 999, and determines whether or not a character string is present in the frame image. If it determines that a character string is present in the frame image, information processing unit 980 records the video identifying information, a character string present frame image, frame identifying information that identifies the specific frame image in which the character string is present, and character string position information such as coordinate values of the character string present in the frame image to memory 981 or recording unit 984 as first index information. Here, the character string present frame image can be reduced in size as necessary such as a thumbnail image. When the same character string is present in a plurality of frame images, the specific frame image in which the character string is present is preferably the first one of such a plurality of the frame images. When it is determined that no character string is present in the frame image, frame identifying information and character string position information are not recorded.

Then, information processing unit 980 determines whether or not a character string is present in each of the second and subsequent frame images in sequence. If it determines that a character string is present in the current frame image, information processing unit 980 records frame identifying information for identifying the character string present frame image in which the character string is present and character string position information such as coordinate values of the character string present in that frame image.

Figure 9:
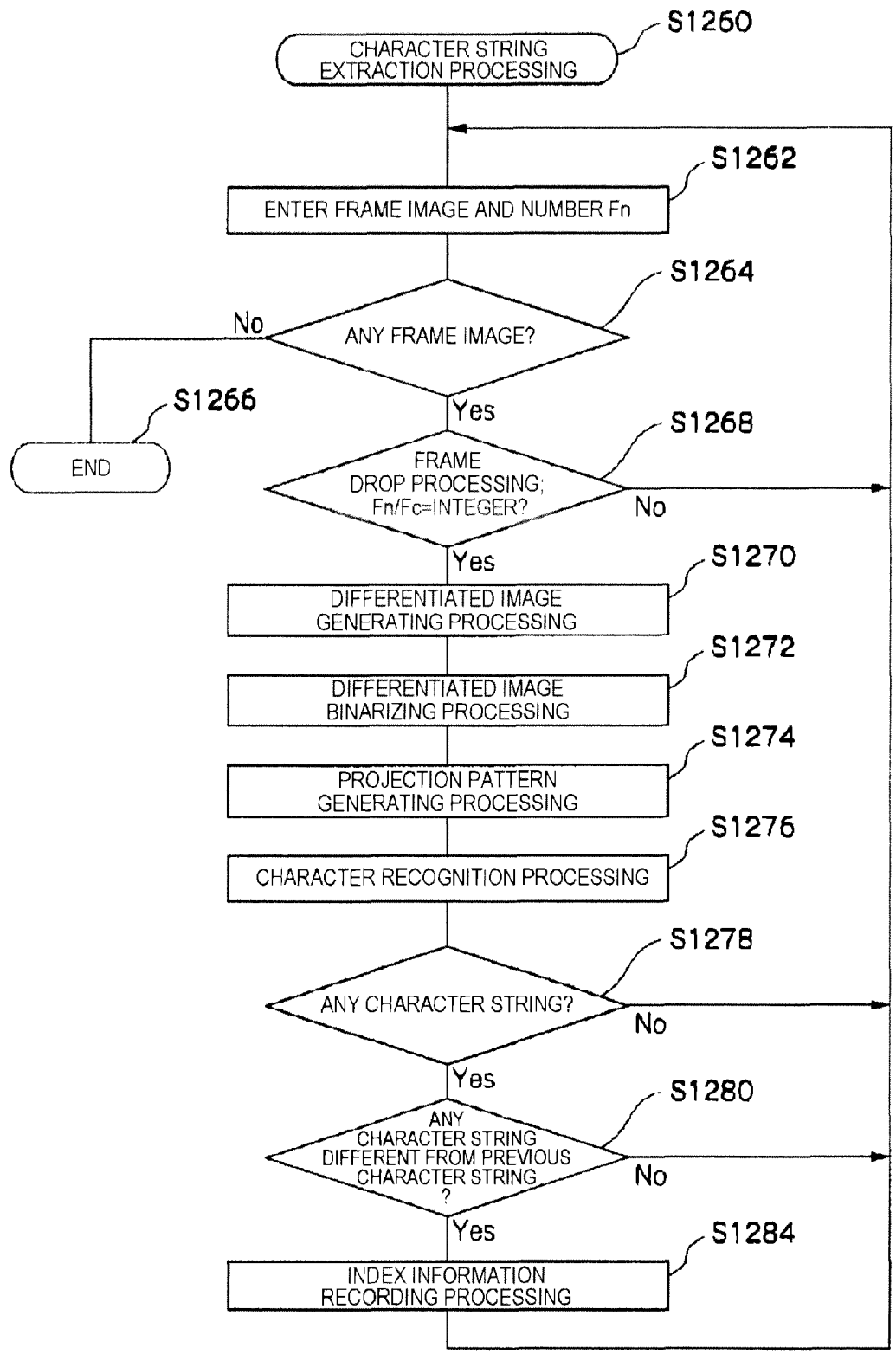
FIG. 9 is a flowchart showing an example of character string extraction processing.

FIG. 9 shows a specific example of processing done in the character string extraction processing (box S1212).

Figure 8:
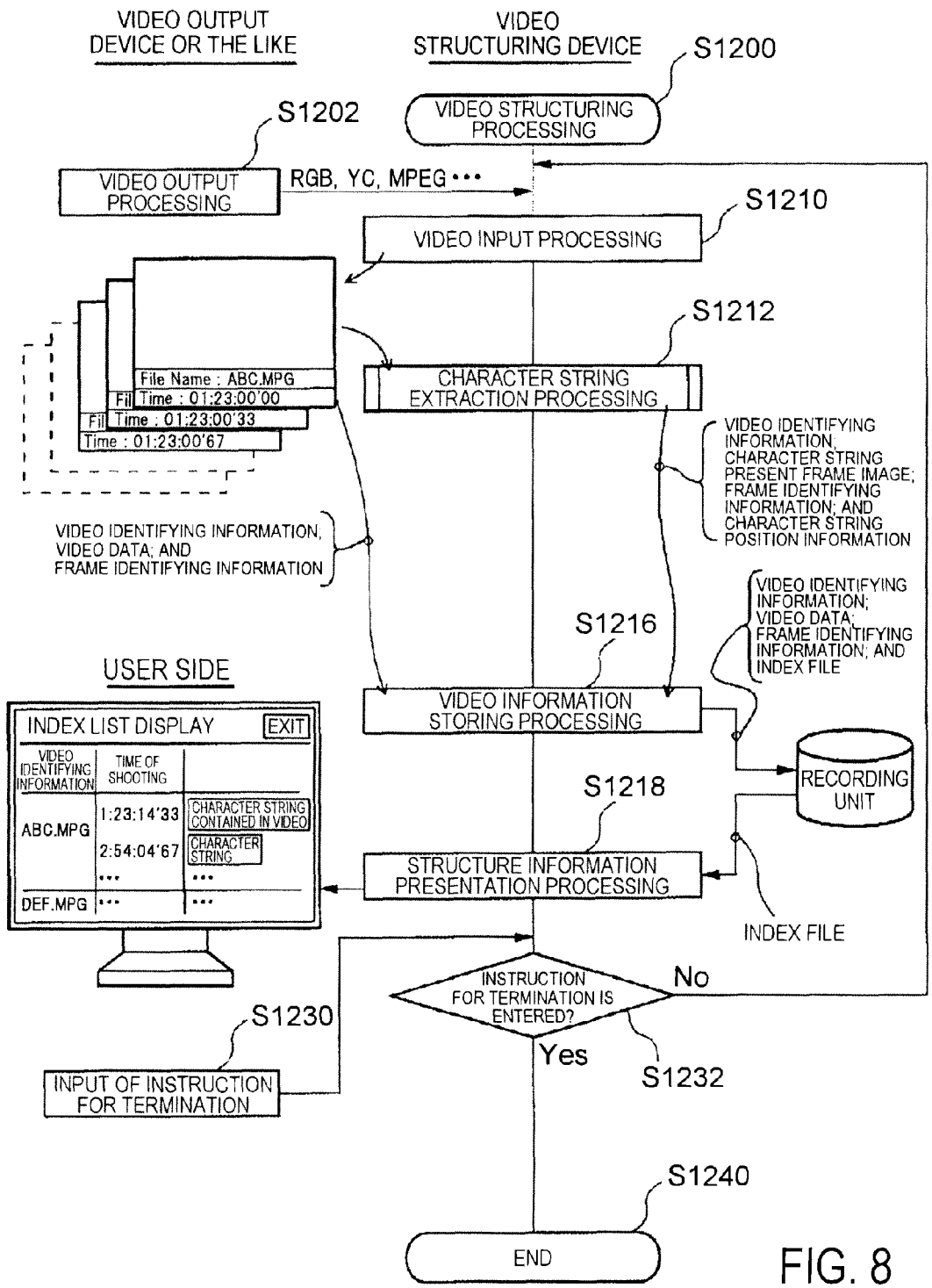
FIG. 8 is a flowchart illustrating video structuring processing in the video structuring device shown in FIG. 7.

When processing being executed by information processing unit 980 proceeds to the "character string extraction processing" (box S1212) shown in FIG. 8, the series of processing shown in FIG. 9 is started. First, character string extraction processing starts at step S1260. Information processing unit 980 performs processing of receiving video identifying information, the n-th frame image (Fn), and frame identifying information for identifying that frame image (Fn) and temporarily storing them in memory 981 or recording unit 984 at step S1262. Then, at step S1264, information processing unit 980 determines whether or not there is any frame image from which character strings can be extracted. If processing of extracting character strings has finished for all the image data and there is no more new frame image, character string extraction processing terminates at step S1266, and information processing unit 980 returns to the processing routine shown in FIG. 8 to execute the next process after the character string extraction processing. On the other hand, when information processing unit 980 determines that there is a new frame image for character string extraction, it calculates Fn/Fc in order to drop every Fc-th frame image out of frame images from which character strings are to be extracted, and determines whether or not the calculation result is an integer at step S1268. Here, Fc is a constant of a natural number. If it determines that the value of Fn/Fc is not an integer, information processing unit 980 returns to step S1262 to receive the next frame image, i.e., (Fn+1)-th frame image. On the other hand, if it determines at step S1268 that the value of Fn/Fc is an integer, information processing unit 980 executes differentiated image generation processing at step S1270. In the differentiated image generation processing, information processing unit 980 differentiates the frame image entered at step S1262 to generate a differentiated image, and temporarily stores the differentiated image in memory 981 or recording unit 984.

Next, information processing unit 980 executes processing for binarizing the differentiated image at step S1272. In the differentiated image binarizing processing, information processing unit 980 reads out the differentiated image generated at S1270 and a threshold value for binarization from memory 981 or recording unit 984, binarizes each pixel value of the differentiated image using the threshold value, and temporarily stores the binarized image data in memory 981 or recording unit 984.

Next, information processing unit 980 executes projection pattern generation processing at step S1274. In the projection pattern generation processing, information processing unit 980 reads out the binarized image data from memory 981 or recording unit 984, and projects the binarized image in the horizontal and vertical directions to generate a histogram of pixels, thereby obtaining a projection pattern. Next, information processing unit 980 defines a continuous area having the value equal to or greater than a predetermined value in the projection pattern as a character string candidate area. Here, it may omit any continuous area having a size smaller than a predetermined value from character string area candidates as noise. Then, by applying layout analysis processing to each of character string candidate areas, information processing unit 980 generates final character string position information.

As in the case described in the first exemplary embodiment, for layout analysis processing, a method like "Document layout analysis by extended split detection method" described in page 406 to 415 of the proceedings for "the IAPR Workshop on Document analysis systems" held in 1998 can be employed. This layout analysis processing extracts image areas other than characters and performs area division with the position of the image areas as boundary to divide the areas into sub-areas. By recursively applying this process to the sub-areas, position information for a character string can be finally obtained, e.g., as coordinate values within the image. The position information for the character string may be coordinate values such as Pa101 and Pb11 shown in FIG. 3, for example.

Next, at step S1276, information processing unit 980 performs character recognition processing on the character string candidate area obtained at step S1274. Subsequently, at step S1278, information processing unit 980 determines whether or not a character string is present in the character string candidate area based on the result of the character recognition processing. If it determines that no character string is present, information processing unit 980 returns to step S1262 to receive the next frame image, i.e., (Fn+1)-th frame image. On the other hand, if it determines that a character string is present, information processing unit 980 determines at step S1280 whether or not the character string recognized in the character string candidate area is the same as the character string that existed in the last character recognition processing.

When it determines at step S1280 that the character string is not different from the previous character string, that is, is the same as the previous character string, information processing unit 980 returns to step S1262 to receive the next frame image, i.e., (Fn+1)-th frame image. Meanwhile, if it determines that the character string recognized this time is different from the previous character string, information processing unit 980 performs index information recording processing at step S1284. In the index information recording processing, information processing unit 980 temporarily records the video identifying information entered at step S1262, a frame image in which the character string is present, namely a character string present frame image, frame identifying information which identifies the frame image in which the character string is present, and character string position information obtained at step S1274 in memory 981 or recording unit 984 as index information which associates them with each other. Examples of time-series frame images that are obtained by decoding the video identifying information "ABC.MPG," character strings included in the frame images, frame identifying information for identifying the frame images, and character string position information at this point are illustrated in FIG. 3. The index information for the video file shown in FIG. 3 is information of the format shown in FIG. 4, for example. When the index information recording processing completes, information processing unit 980 returns to step S1262, where it performs processing for receiving the next frame image, i.e., (Fn+1)-th frame image.

In the character string extraction processing described above, a character string present frame image in which a character string is present may also be recorded being reduced in size as a thumbnail image as necessary so that it requires less storage capacity and is easy to display at the time of index list display.

Referring back to FIG. 8, when the character string extraction processing (box S1212) completes, information processing unit 980 executes "video information storing processing" (box S1216). In the video information storing processing, information processing unit 980 retrieves the first index information temporarily stored in memory 981 or recording unit 984 which associates video identifying information, the frame image in which the character string is present, frame identifying information for identifying the frame image, and character string position information for the character string with one another, and stores it as a first index file. An example of the first index file is shown in FIG. 5.

If video output device 20 and/or imaging device 14 supplies video signals such as RGB or YC signals at the "video output processing" (box S1202) described above, information processing unit 980 digitalizes the video signals, encodes it into a moving picture file in MPEG or the like at compression/decompression unit 953, and records it in recording unit 984 and/or recording medium 977. If video output device 20 and/or imaging device 14 supplies video signals encoded in MPEG or the like in the "video output processing" (box S1202), information processing unit 980 generates a moving picture file for recording from the video signals, and records the file in recording unit 984 or recording medium 977. These moving picture files are given unique video identifying information for identification, and frame identifying information which identifies individual frame images when the files are decoded is recorded therein. When storing processing of video information completes, information processing unit 980 executes "structure information presentation processing" (box S1218).

In the structure information presentation processing, information processing unit 980 retrieves the first index file recorded in recording unit 984 or recording medium 977 and generates a display file for index list display such as the one shown in FIG. 6. Then, information processing unit 980 reads out a frame image in which a character string is present and which is described in the first index file from recording unit 984 or recording medium 977 and expands it in memory 981. Then, information processing unit 980 attaches to the index list display a character string image which is generated by cutting out a character string candidate area in which a character string is present from the frame image based on the character string position information. Information processing unit 980 outputs display signals for the index list display thus generated to display device 172 via display interface 973. An example of index list display is shown in FIG. 6. When the structure information presentation processing completes, information processing unit 980 executes the processing of determining whether an instruction for termination has been entered as shown at step S1232.

At step S1232, information processing unit 980 determines whether or not the user has entered an instruction to terminate the video structuring processing through input device 170. If the user has entered an instruction for termination such as by selecting a button for exiting index list display as shown in box S1230, information processing unit 980 determines that an instruction for termination has been entered, and terminates the video structuring processing at step S1240. On the other hand, if it determines that the user has not entered an instruction for termination, information processing unit 980 returns to the video input processing (box S1210). As a result, the video structuring processing continues to be executed.

If the user views the index list display shown in FIG. 6 and selects desired character string display 126 or a character string image and the like by operating input device 170, such as a mouse or a keyboard, to designate a replay point for the video, information processing unit 980 retrieves the video file for the selected video identifying information from recording unit 984 or the like, decodes the file, and outputs a video starting from the frame image identified by corresponding frame identifying information 124 to display device 172 for display. In the example shown in FIG. 6, frame identifying information is represented by the time of shooting.

Next, the video structuring device according to a third exemplary embodiment will be described with reference to FIG. 10. In video structuring device 300 shown in FIG. 10, video identifying information such as the name of a file in which a video is recorded or a program title, frame images, and frame identifying information for identifying the individual frame images are supplied to character string extraction unit 312 from video input unit 310. Then, if character string extraction unit 312 determines that a character string is present in the input frame images, it outputs the video identifying information, a character string present frame image, frame identifying information identifying the specific frame image in which the character string is present, and character string position information such as coordinate values of the character string present in the frame image to video information storage unit 316 as index information. The character string present frame image can be reduced in size as necessary, such as a thumbnail image. Structure information presentation unit 318 presents the image of the character string to the user. If the user designates character string display 126 or the like which represents a replay point of the video, video playback unit 320 plays back the video starting from the replay point designated by the user.

As processing performed by video input unit 310 and that by character string extraction unit 312 of video structuring device 300 of the third exemplary embodiment are the same as processing performed by video input unit 210 and that by character string extraction unit 212 of video structuring device 200 shown in FIG. 2, detailed description of them is omitted here.

In this video structuring device 300, video information storage unit 316 stores, as a first index file, first index information outputted by character string extraction unit 312 which associates video identifying information, a character string present frame image in which a character string is present, frame identifying information which identifies the frame image, and character string position information for the character string with each other. Here, video information storage unit 316 stores the video identifying information, video data, and frame identifying information outputted by video input unit 310 as video data.

Structure information presentation unit 318 retrieves an index file stored in video information storage unit 316 to generate index list display information and outputs the index list display to display device 172. Display device 172 makes index list display such as shown in FIG. 6 for notification to the user.

When the user operates input device 170 such as a mouse and a keyboard to select replay point information such as desired character string display 126 or the time of shooting, structure information presentation unit 318 selects video identifying information and frame identifying information corresponding to the replay start point, and outputs them to video information storage unit 316. Upon receipt of the video identifying information and frame identifying information from structure information presentation unit 318, video information storage unit 316 reads out video data corresponding to the obtained video information, and outputs it to video playback unit 320 together with the frame identifying information. When video playback unit 320 is configured to be able to decode a video file to obtain time-series frame images, video information storage unit 316 outputs a video file and frame identifying information to video playback unit 320. Video playback unit 320 decodes the obtained video file and displays frame images starting from the frame identifying information, thereby presenting a video from the replay point to the user. When video playback unit 320 is configured to obtain and display time-series frame images, video information storage unit 316 outputs time-series frame images starting from the frame identifying information to video playback unit 320. In the latter case, video playback unit 320 displays frame images starting from the frame identifying information, thereby presenting the video starting from the replay point to the user.

Figure 10:
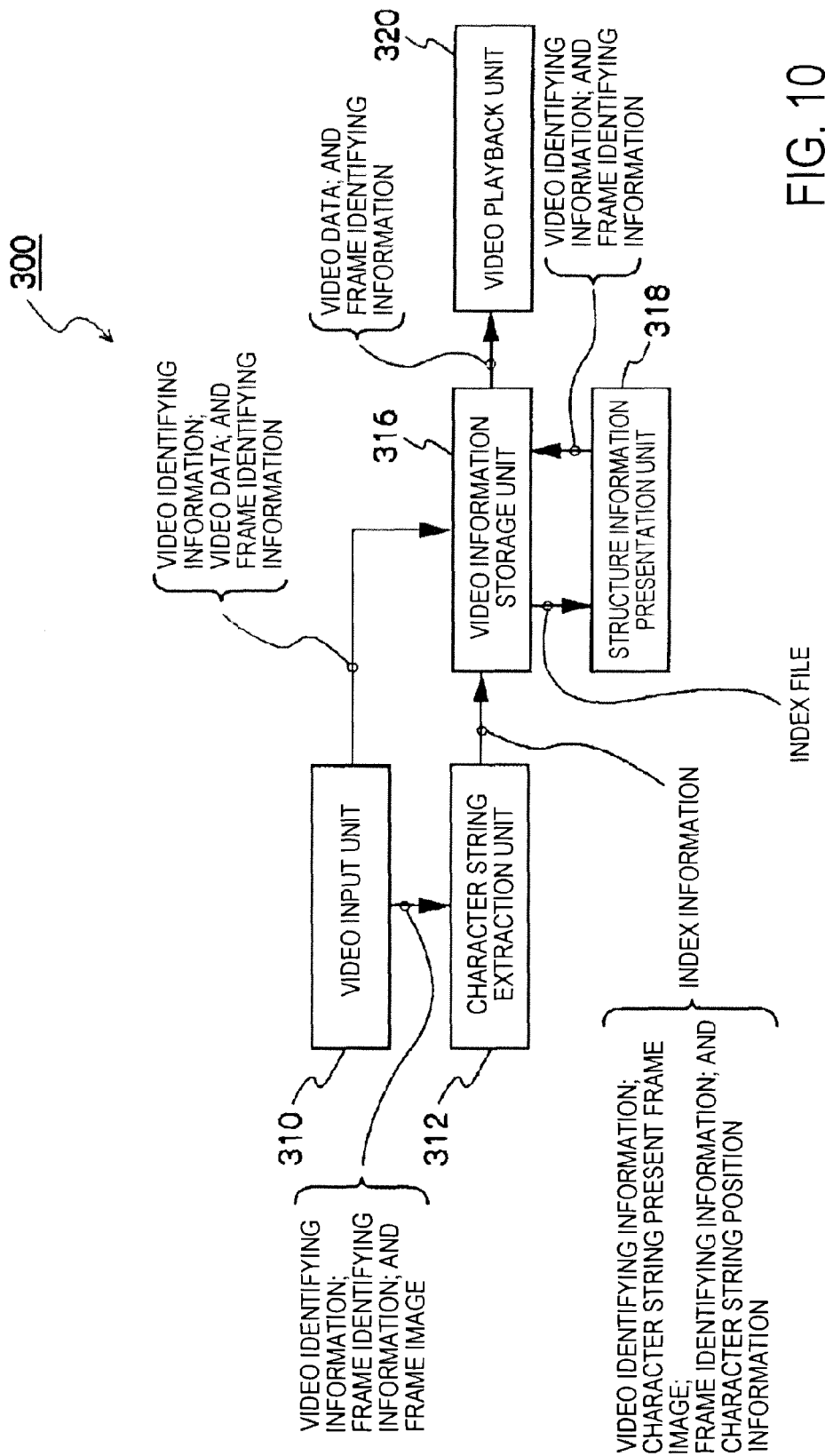
FIG. 10 is a block diagram showing the video structuring device according to a third exemplary embodiment.

Since video structuring device 300 shown in FIG. 10 uses a portion of a character string present frame image for character string display 126 which is in the form of an image serving as an index, it has less possibility of a phenomenon in which character string display 126 does not agree with the contents of a video than when only character strings resulting from character recognition are displayed. Accordingly, the user can view the index list display which shows character string display 126 to see the contents of the video and easily locate a specific picture.

Figure 11:
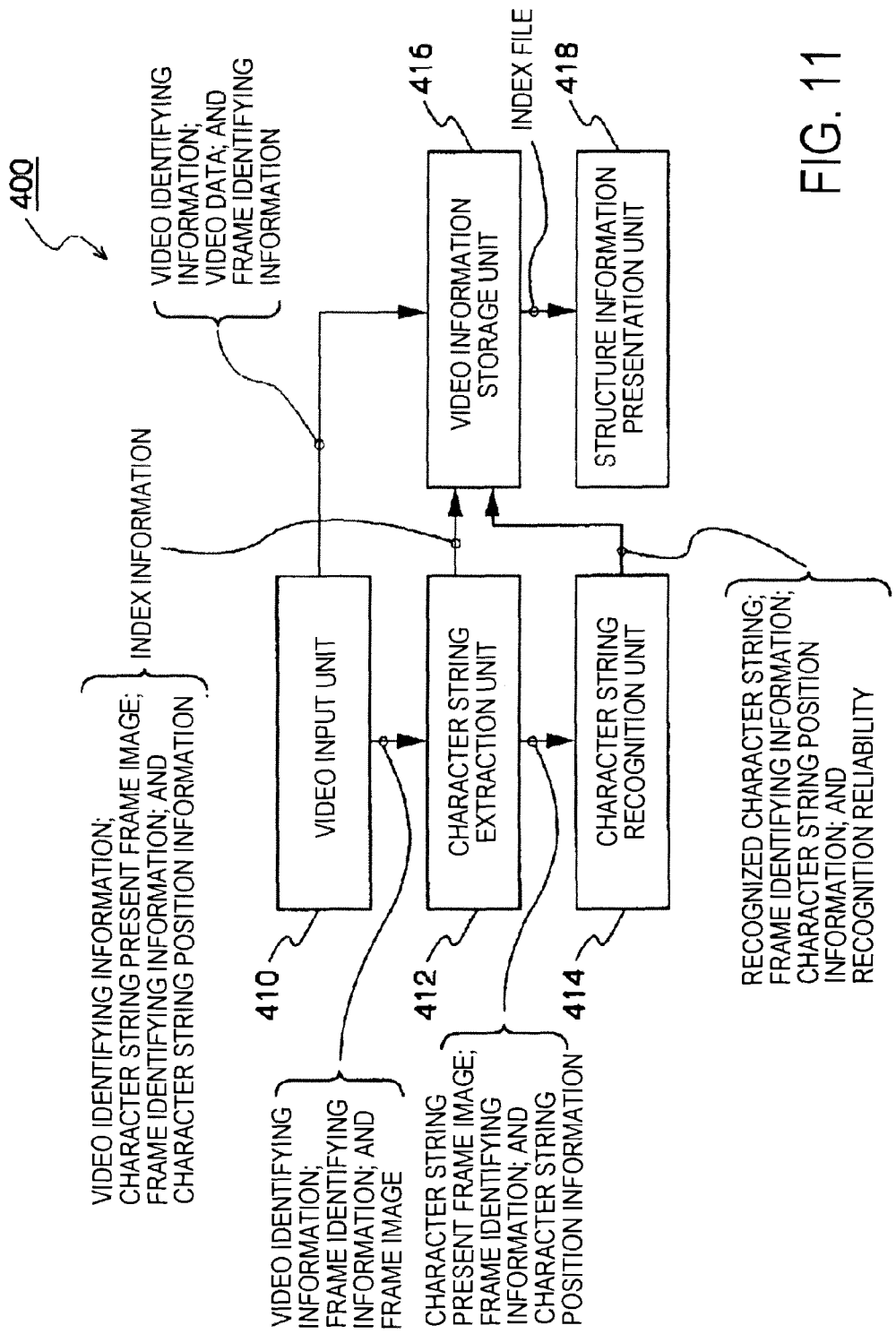
FIG. 11 is a block diagram showing the video structuring device according to a fourth exemplary embodiment.

FIG. 11 shows a video structuring device according to a fourth exemplary embodiment. In this video structuring device 400, video identifying information such as the name of a file in which a video is recorded or a program title, frame images, and frame identifying information for identifying the individual frame images are supplied to character string extraction unit 412 from video input unit 410. If character string extraction unit 412 determines that a character string is present in the input frame images, it outputs the video identifying information, a character string present frame image, frame identifying information for identifying the specific frame image in which the character string is present, and character string position information such as coordinate values of the character string present in the frame image to video information storage unit 416 as index information. Character string extraction unit 412 also outputs the character string present frame image, frame identifying information, and character string position information to character string recognition unit 414. The character string present frame image can be reduced in size as necessary, such as a thumbnail image.

Character string recognition unit 414 cuts out an area defined by the character string position information from the character string present frame image as image data, and extracts a character string contained in the cut-out image data as a recognized character string, namely character codes, and outputs the recognized character string to video information storage unit 416. Structure information presentation unit 418 presents the image of the character string or the recognized character string to the user.

As processing performed by video input unit 410 and processing up to the output of index information by character string extraction unit 412 to video information storage unit 416 in video structuring device 400 of the fourth exemplary embodiment are the same as processing performed by video input unit 210 and that by character string extraction unit 212 of video structuring device 200 shown in FIG. 2 respectively, detailed description of them is omitted here.

If character string extraction unit 412 determines that a character string is present in a frame image, it outputs first index information to video information storage unit 416 and also outputs a character string present frame image, frame identifying information, and character string position information to character string recognition unit 414. However, if it determines that no character string is present in the frame image, character string extraction unit 412 does not output a character string present frame image, frame identifying information, and character string position information to character string recognition unit 414.

Character string recognition unit 414 extracts a character string as a recognized character string (or character codes) from a character string present frame image by using image data for the character string present in the area defined by the character string position information and dictionary data for character string recognition. The character string recognition processing performed here can utilize the character clipping method and apparatus therefor that is described in JP-A-3-141484 or the fast recognition and retrieval system and a recognition and retrieval acceleration method used therefor which are described in JP-A-2001-034709, for example. In the character string recognition processing, the recognition reliability of a result of character string recognition may be calculated. The reliability of character string recognition may be a likelihood value for character recognition on individual characters in a character string image, or the inverse of the average of the distance value, for example.

When character string recognition processing completes, character string recognition unit 414 then outputs the resulting recognized character string, frame identifying information for a frame image in which the character string is present, character string position information, and the recognition reliability of the character string resulting from the character string recognition to video information storage unit 416. Video information storage unit 416 stores, as a second index file, second index information that associates the video identifying information, character string present frame image in which the character string is present, frame identifying information for identifying the frame image, character string position information for the character string, recognized character string, and the recognition reliability with one another, which were outputted by character string extraction unit 412 and character string recognition unit 414. Video information storage unit 416 also stores the video identifying information, video data, and frame identifying information outputted by video input unit 410 as video data.

FIG. 12 shows an example of the second index file. In the second index file (INDEX02.XML), in addition to the information described in the first index file shown in FIG. 5, recognized character strings and the recognition reliability for the character strings are stored being associated with frame identifying information. Here, information on the time of shooting is used as frame identifying information.

Structure information presentation unit 418 retrieves the second index file stored by video information storage unit 416 and generates index list display information, which is outputted to display device 172. Display device 172 makes index list display such as shown in FIG. 13 for notification to the user. FIG. 13 shows an example of index list display.

As shown in FIG. 13, the index list display indicates title 120 of the index list display, video identifying information display field 122 for identifying video files, frame identifying information 124 such as the time of shooting for identifying a frame image in which a character string is present, character string display 126 which is an image generated by cutting out an area in which a character string is present from a frame image by using video data and character string position information for the frame image, and recognized character string 138.

The user can select replay point information such as desired character string display 126, recognized character string 138, time of shooting, and the like by operating input device 170, such as a mouse and a keyboard. When the user designates a replay point of a video by selecting a desired character string display 126 and the like, the video file for the selected video identifying information may be retrieved and a video starting from the frame image identified by corresponding frame identifying information 124 may be displayed on display device 172. The example shown here employs the time of shooting as replay point information.

Recognized character string 138 may be always displayed; however, it is also possible not to display recognized character string 138 when its reliability of recognition is at or below a predetermined threshold value $\Theta 1$, e.g., when the recognition reliability is at or below threshold value $\Theta 1 = 50\%$. It is also possible to display only recognized character string 138 and not character string display 126 which is in the form of an image when the recognition reliability is at or above a predetermined threshold value $\Theta 2$, e.g., when the recognition reliability is at or above threshold value $\Theta 2=90\%$.

Since this exemplary embodiment uses a portion of a character string present frame image for character string display 126 which is in the form of an image serving as an index, it has less possibility of a phenomenon in which character string display 126 does not agree with the contents of a video than when only character strings resulting from character recognition are displayed. Accordingly, the user can view the index list display to see the contents of the video and easily locate a specific picture. In addition, since this exemplary embodiment enables control of display method between character string display in the form of an image and display of recognized character strings as a function of the reliability of a character string recognition result, the user can select an index with confidence in recognized character strings and search a video with improved efficiency.

Figure 14:
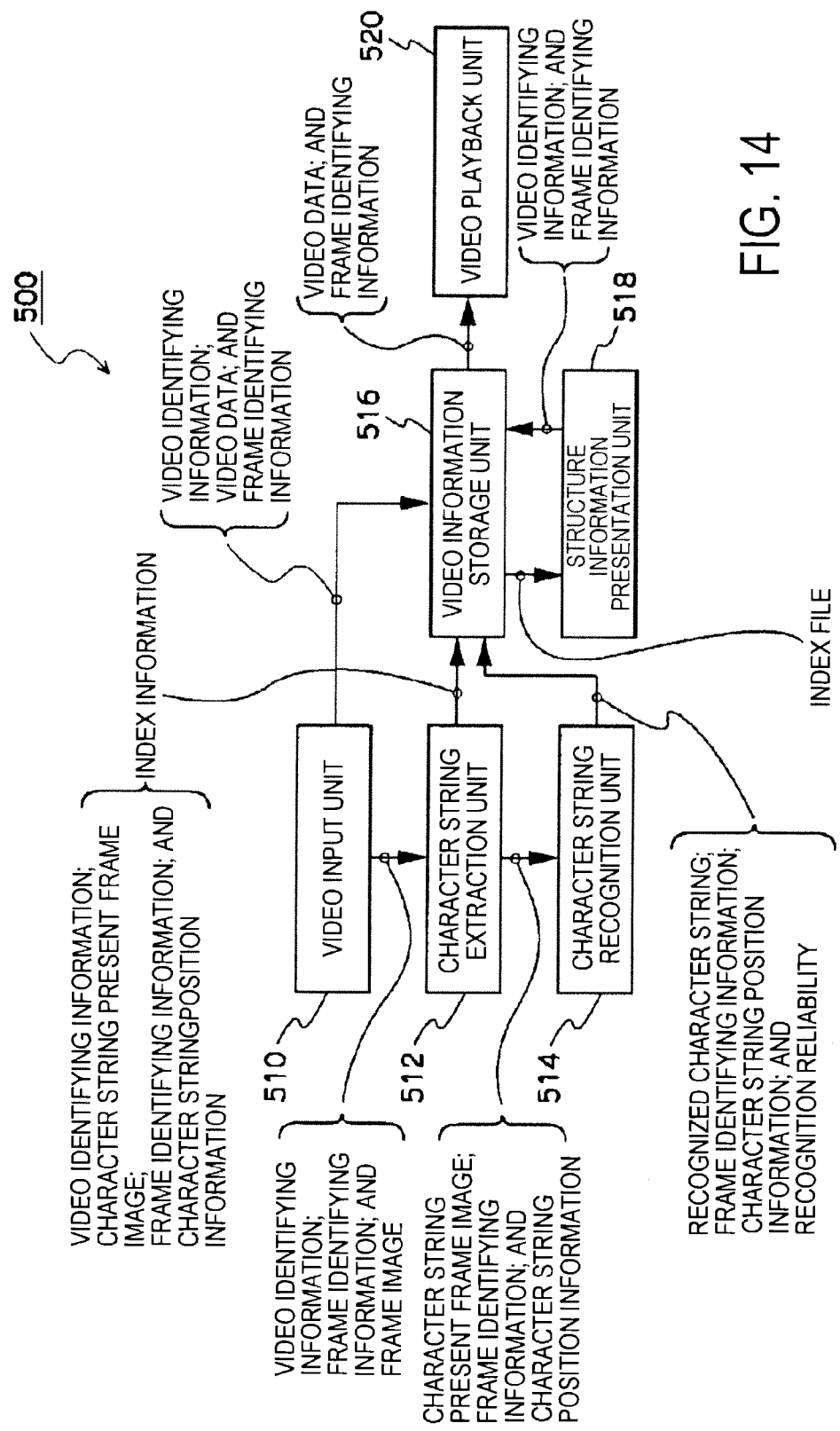
FIG. 14 is a block diagram showing the video structuring device according to a fifth exemplary embodiment.

FIG. 14 shows a video structuring device according to a fifth exemplary embodiment. In this video structuring device 500, video identifying information such as the name of a file in which a video is recorded or a program title, frame images, and frame identifying information for identifying the individual frame images are entered to character string extraction unit 512 from video input unit 510. Then, if character string extraction unit 512 determines that a character string is present in the input frame images, it outputs the video identifying information, a character string present frame image, frame identifying information, and character string position information such as coordinate values of the character string present in the frame image to video information storage unit 516 as index information. Character string extraction unit 512 also outputs the character string present frame image, frame identifying information, and character string position information to character string recognition unit 514. Character string recognition unit 514 extracts a character string as a recognized character string (or character codes) from image data for the character strings present in an area within the character string present frame image which is defined by the character string position information, and outputs the recognized character string, frame identifying information, character string position information, and the reliability of recognition to video information storage unit 516.

Structure information presentation unit 518 presents the image of a character string or a recognized character string to the user. When the user selects replay point information such as desired character string display 126, recognized character string 138, the time of shooting or the like, structure information presentation unit 518 retrieves a video file identified by video identifying information based on the user's selection from video information storage unit 516, and displays a video starting from the frame image identified by corresponding frame identifying information 124 on display device 172.

As processing performed by video input unit 510, character string extraction unit 512 and character string recognition unit 514, processing by video information storage unit 516 for storing information, and a portion of processing up to the presentation of structure information by structure information presentation unit 518 of video structuring device 500 of the fifth exemplary embodiment are the same as those performed by video input unit 410, character string extraction unit 412, character string recognition unit 414, video information storage unit 416 and structure information presentation unit 418 of video structuring device 400 shown in FIG. 11, detailed description on them is omitted here.

Video information storage unit 516 stores, as a second index file, second index information that associates the video identifying information, character string present frame image, frame identifying information for identifying the frame image, character string position information for the character string, recognized character string, and the recognition reliability with one another, which were outputted by character string extraction unit 512 and character string recognition unit 514. Video information storage unit 516 also stores the video identifying information, video data, and frame identifying information outputted by video input unit 510 as video data.

Structure information presentation unit 518 retrieves the second index file stored by video information storage unit 516, generates index list display information, and outputs the index list display to display device 172. Display device 172 makes index list display such as shown in FIG. 13 for notification to the user.

The user can designate a replay start point of a video by operating input device 170 such as a mouse and a keyboard to select replay point information such as desired character string display 126, recognized character string 138, time of shooting and the like. When the user designates a replay start point of a video, structure information presentation unit 518 selects video identifying information and frame identifying information corresponding to the replay start point, and outputs them to video information storage unit 516. Upon receipt of the video identifying information and frame identifying information from structure information presentation unit 518, video information storage unit 516 reads out video data corresponding to the obtained video information, and outputs it to video playback unit 520 together with the frame identifying information. When video playback unit 520 is configured to be able to decode a video file to obtain time-series frame images, video information storage unit 516 outputs a video file and frame identifying information to video playback unit 520. In this case, video playback unit 520 decodes the obtained video file and displays frame images starting from the frame identifying information, thereby presenting a video from the replay point to the user. When video playback unit 520 is configured to obtain and display time-series frame images, video information storage unit 516 outputs time-series frame images starting from the frame identifying information to video playback unit 520. In the latter case, video playback unit 520 displays frame images starting from the frame identifying information, thereby presenting the video starting from the replay point to the user.

Since this exemplary embodiment uses a portion of a character string present frame image for character string display 126 which is in the form of an image serving as an index, it has less possibility of a phenomenon in which character string display 126 does not agree with the contents of a video than when only character strings resulting from character recognition are displayed. The user can view the index list display to see the contents of the video and easily locate a specific picture. In addition, since this exemplary embodiment enables control of display method between character string display in the form of an image and display of a recognized character string as a function of the reliability of a character string recognition result, the user can select an index with confidence in recognized character strings and search a video with improved efficiency.

Figure 15:
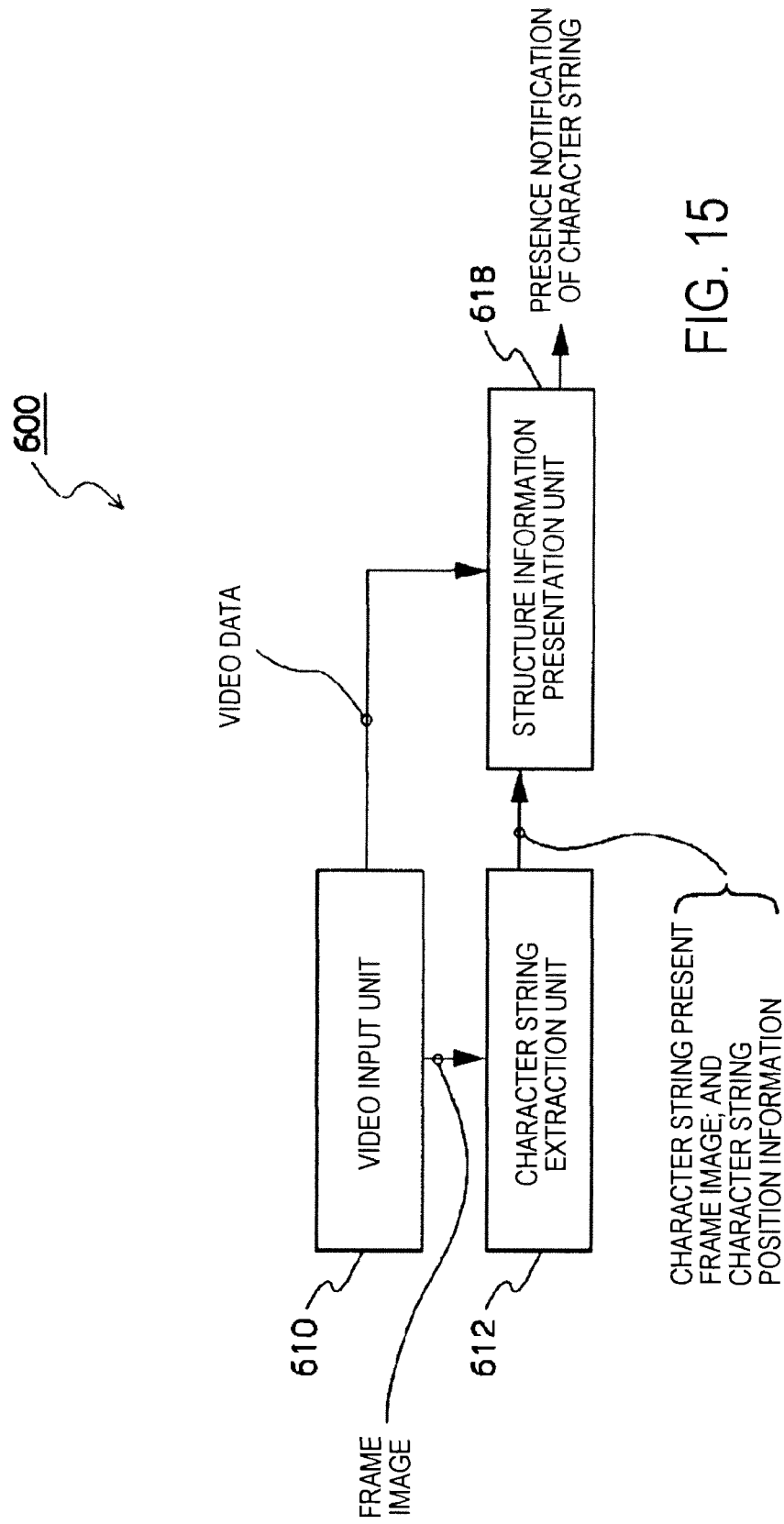
FIG. 15 is a block diagram showing the video structuring device according to a sixth exemplary embodiment.

FIG. 15 shows a video structuring device according to a sixth exemplary embodiment. In this video structuring device 600, when a frame image is supplied from video input unit 610, character string extraction unit 612 determines whether any character string is present in the input frame image. If it determines that a character string is present, character string extraction unit 612 outputs the fact a character string is present, a character string present frame image, and character string position information such as coordinate values of the character string present in the frame image to structure information presentation unit 618. Then, structure information presentation unit 618 promptly displays a frame image or a character string image corresponding to the character string position information, or displays information to the effect that a character string is present in the frame image for notification to the user.

Video input unit 610 is configured to be able to receive digitalized video data or video signals such as RGB signals and composite video signals as input and output video data for display to structure information presentation unit 618. Video input unit 610 also receives digitalized video data or video signals such as RGB signals and composite video signals as input, and generates frame images from the input video signals for output to character string extraction unit 612.

Upon input of a frame image from video input unit 610, character string extraction unit 612 determines whether or not any character string is present in the frame image. Then, if it determines that a character string is present in the frame image, character string extraction unit 612 outputs the fact that a character string is present, a character string present frame image, and character string position information such as coordinate values of the character string present in the frame image to structure information presentation unit 618.

Structure information presentation unit 618 usually generates a video for display based on video data supplied from video input unit 610, and outputs the video to display device 172 for presentation to the user. Upon receipt of the fact that a character string is present in a frame image, character string present frame image, and character string position information such as coordinate values of the character string present in the frame image from character string extraction unit 612, structure information presentation unit 618 displays information indicating the presence of a character string in a frame image for notification to the user. Presence of a character string in a frame image may be notified by audibly providing information on appearance of the character string, or a new character string display is provided in index list display such as shown in FIG. 6 to update the index list display. Structure information presentation unit 618 may also turn on the power switch of display device 172 when it is determined that a character string is present in a frame image to draw the user's attention. Structure information presentation unit 618 may also send an electronic mail message notifying the presence of a character string to a predetermined mail address when it is determined that a character string is present in a frame image.

Figure 16:
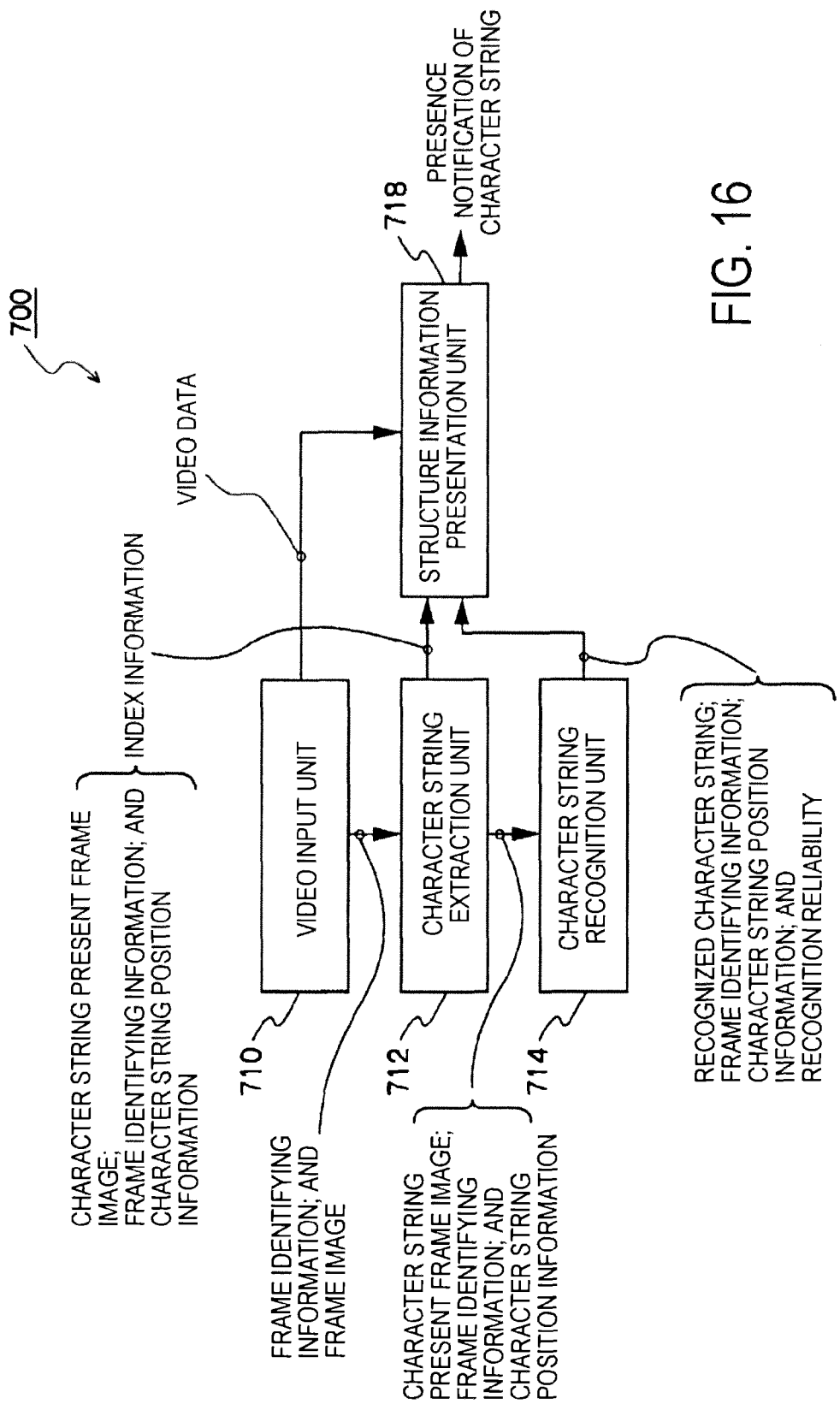
FIG. 16 is a block diagram showing the video structuring device according to a seventh exemplary embodiment.

FIG. 16 shows a video structuring device according to a seventh exemplary embodiment. In video structuring device 700 shown in FIG. 16, character string extraction unit 712 receives frame images and frame identifying information for identifying the individual frame images from video input unit 710. If it determines that a character string is present in the input frame images, character string extraction unit 712 outputs the character string present frame image, frame identifying information, and character string position information such as coordinate values of the character string present in the frame image to structure information presentation unit 718 as third index information. Character string extraction unit 712 also outputs the character string present frame image, frame identifying information, and character string position information to character string recognition unit 714. Character string recognition unit 714 extracts the character string as a recognized character string (or character codes) from image data for the character string present in an area within the character string present frame image which is defined by the character string position information, and outputs the recognized character string, frame identifying information, character string position information, and the reliability of recognition to structure information presentation unit 718.

In video structuring device 700 of the seventh exemplary embodiment, video input unit 710 is capable of, with input of digitalized video data or video signals such as RGB signals and composite video signals, outputting digitalized video data and frame identifying information which identifies frame images during playback of each frame image of the video data to structure information presentation unit 718. Video input unit 710 receives as input such digitalized video data or video signals, generates frame images or time-series frame images from the input video signals, and outputs the frame images and frame identifying information to character string extraction unit 712.

Character string extraction unit 712 first receives a first frame image from video input unit 710, and determines whether or not any character string is present in the frame image. If it determines a character string is present in the frame image, character string extraction unit 712 then outputs the video identifying information, a character string present frame image, frame identifying information for identifying the specific frame image in which the character string is present, and character string position information such as the coordinate values of the character string present in the frame image to structure information presentation unit 718 as third index information. At the same time, character string extraction unit 712 outputs the character string present frame image, frame identifying information, and character string position information to character string recognition unit 714. Here, the character string present frame image can be reduced in size as necessary, such as a thumbnail image. If the same character string is present in a plurality of frame images, the specific frame image in which the character string is present is preferably the first one of such a plurality of the frame images. If no character string is present in the frame image, character string extraction unit 712 does not output a character string present frame image, frame identifying information and character string position information.

Character string extraction unit 212 then determines whether or not a character string is present in the second frame image. If it determines that a character string is present in the frame image, character string extraction unit 212 outputs the character string present frame image in which the character string is present, frame identifying information for identifying the character string present frame image, and character string position information such as coordinate values of the character string present in the frame image. Character string extraction unit 212 repeats this processing on subsequent frame images in sequence.

Character string recognition unit 714 uses dictionary data for character string recognition to extract a character string as a recognized character string (or character codes) contained in the image data for the character string present in an area within the character string present frame image which is defined by character string position information.

The seventh exemplary embodiment can also utilize the character clipping method and apparatus therefor that is described in JP-A-3-141484 or the fast recognition and retrieval system and a recognition and retrieval acceleration method used therefor which are described in JP-A-2001-034709 for character string recognition processing as in the exemplary embodiments described above. The recognition reliability of a result of character string recognition may also be calculated in this character string recognition processing. The reliability of character string recognition may be a likelihood value for character recognition on individual characters in a character string image, or the inverse of the average of the distance value, for example. When character string recognition completes, character string recognition unit 714 outputs the resulting recognized character string, character string position information, frame identifying information for the frame image in which the character string is present, and the recognition reliability of the character string resulting from the character string recognition to structure information presentation unit 718.

Structure information presentation unit 718 usually generates a video for display based on video data supplied from video input unit 710, and outputs the video to display device 172 for presentation to the user. Upon receipt of third index information and the like that includes the fact that a character string is present in a frame image, a character string present frame image, and character string position information such as coordinate values of the character string present in the frame image, frame identifying information and the like from character string extraction unit 712 and character string recognition unit 714, structure information presentation unit 718 displays information to the effect that a character string is present in the frame image for notification to the user. Structure information presentation unit 718 also provides new character string display 126 or recognized character string 138 in index list display shown in FIG. 13 to update the index list display.

Recognized character string 138 may be always displayed; however, it is also possible not to display recognized character string 138 when its reliability of recognition is at or below a predetermined threshold value Θ1, e.g., when the recognition reliability is at or below threshold value Θ1=50%. It is also possible to display only recognized character string 138 and not character string display 126 which is in the form of an image when the recognition reliability is at or above a predetermined threshold value Θ2, e.g., when the recognition reliability is at or above threshold value Θ2=90%.

In this exemplary embodiment, presence of a character string in a frame image may be notified by audibly providing information on appearance of the character string. Structure information presentation unit 718 may also turn on the power switch of display device 172 when it is determined that a character string is present in a frame image to draw the user's attention.

As information to be notified to the user, the user may be notified of a specific character string predefined by the user. In this case, a character string which the user wants to use for notification is registered to the recording unit or the like in advance. Upon receiving information to the effect that a character string is present in a frame image from character string extraction unit 712, structure information presentation unit 718 retrieves the character string registered in the recording unit or the like therefrom and displays the character string on display device 172. Furthermore, the form or contents of a notification to the user that a character string is present in a frame image may be changed in accordance with the reliability of recognition.

As one form of information notification to the user, the user may be notified of the presence of a character string when a predetermined specific character string is present in a video. In this case, upon obtaining a recognized character string from character string recognition unit 712, structure information presentation unit 718 determines whether or not the character string is a character string included in a group of predetermined keywords. If it determines that the recognized character string is a character string included in the predetermined keywords, structure information presentation unit 718 displays information to the effect that the character string is present in the video on display device 172 or outputs sound from an audio output device so as to notify the user that the predetermined character string has appeared.

Structure information presentation unit 718 may also send an electronic mail message notifying the presence of a character string to a predetermined mail address when it is determined that a character string is present in a frame image. A recognized character string which has been recognized and outputted by character string recognition unit 714 may be embedded in the e-mail message to notify the user of the recognized character string itself. In this case, embedding of the recognized character string may be executed in accordance with the reliability of recognition upon recognizing the character string. For example, the recognized character string may be embedded in an e-mail message only when the reliability of recognition is at or above 50%.

Figure 17:
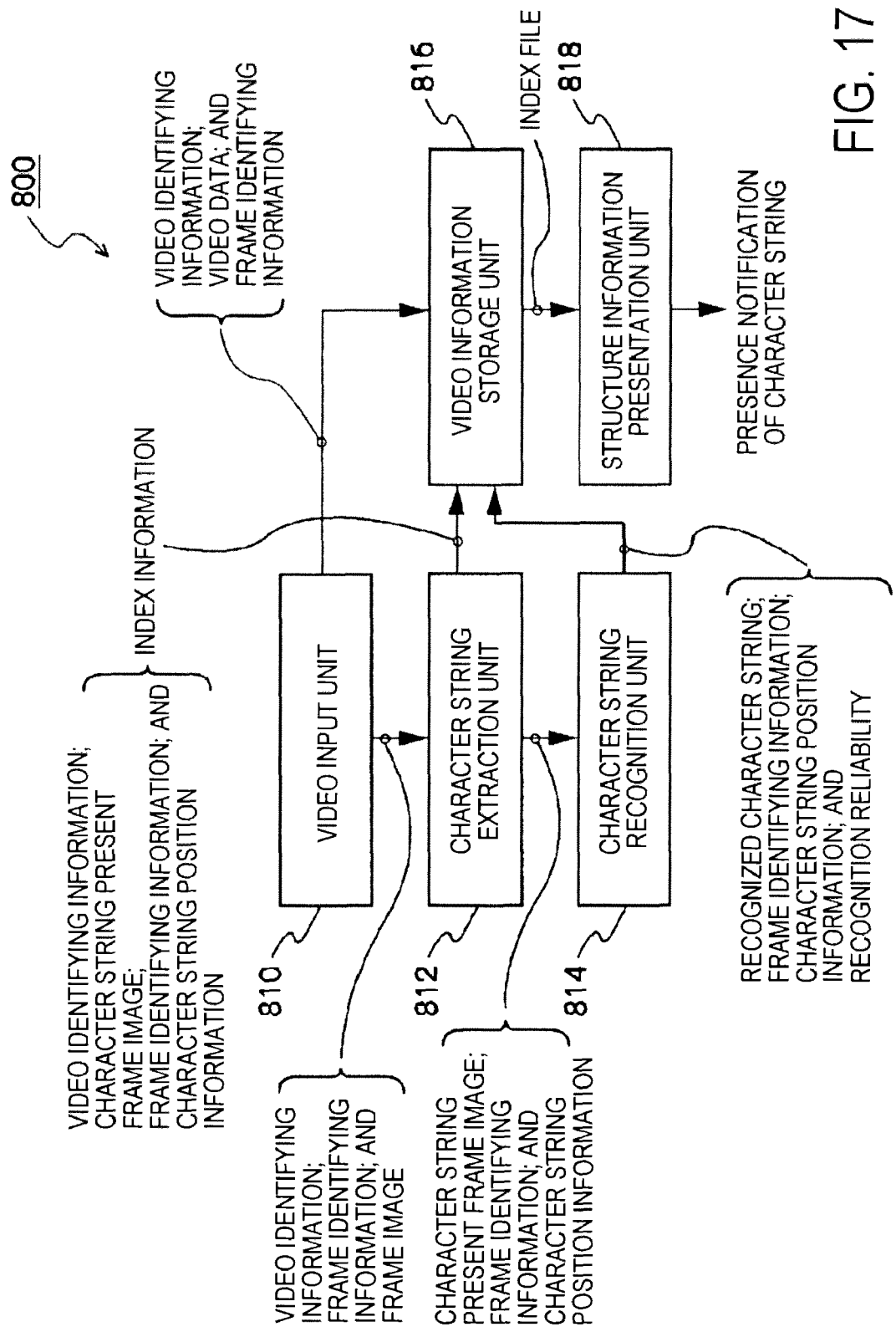
FIG. 17 is a block diagram showing the video structuring device according to an eighth exemplary embodiment.

FIG. 17 shows a video structuring device according to an eighth exemplary embodiment. Video structuring device 800 has the functions of video structuring device 400 shown in FIG. 11 as well as those of video structuring device 700 shown in FIG. 16. Here, structure information presentation unit 818 is configured to be able to make index list display and notify the presence of a character string to the user.

Video input unit 810 of video structuring device 800 has the functions of video input unit 410 of video structuring device 400 shown in FIG. 11 and those of video input unit 710 of video structuring device 700 shown in FIG. 16. Character string extraction unit 812 of video structuring device 800 has the functions of character string extraction unit 412 shown in FIG. 11 and those of character string extraction unit 712 shown in FIG. 16. Character string recognition unit 814 has the functions of character string recognition unit 414 shown in FIG. 11 and those of character string recognition unit 714. Video information storage unit 816 of video structuring device 800 has the functions of video information storage unit 716 shown in FIG. 16, and structure information presentation unit 818 has the functions of structure information presentation unit 418 shown in FIG. 11 and those of structure information presentation unit 718 shown in FIG. 16.

Structure information presentation unit 818 makes index list display such as shown in FIG. 13 on display device 172 for notification to the user. Upon receipt of information to the effect that a character string is present in a frame image from character string extraction unit 812, structure information presentation unit 818 displays information to the effect that a character string is present in a frame image for notification to the user and also shows new character string display 126 or recognized character string 138 in index list display to update the index list display.

Recognized character string 138 may be always displayed; however, it is also possible not to display recognized character string 138 when its reliability of recognition is at or below a predetermined threshold value Θ1, e.g., when the recognition reliability is at or below threshold value Θ1=50%. It is also possible to display only recognized character string 138 and not character string display 126 which is in the form of an image when the recognition reliability is at or above a predetermined threshold value Θ2, e.g., when the recognition reliability is at or above threshold value Θ2=90%.

In this exemplary embodiment, presence of a character string in a frame image may also be notified by audibly providing information on appearance of the character string. Structure information presentation unit 718 may also turn on the power switch of display device 172 when it is determined that a character string is present in a frame image to draw the user's attention.

As information to be notified to the user, the user may be notified of a predefined specific character string. In this case, a character string desired to be used for notification is registered to the recording unit or the like in advance. When structure information presentation unit 818 receives information to the effect that a character string is present in a frame image from character string extraction unit 812, structure information presentation unit 818 retrieves the registered character string from the recording unit or the like and displays the character string on display device 172. Furthermore, the form or contents of a notification to the user that a character string is present in a frame image may be changed in accordance with the reliability of recognition.

Structure information presentation unit 818 may also send an electronic mail message notifying the presence of a character string to a predetermined mail address when it is determined that a character string is present in a frame image. A recognized character string which has been recognized and outputted by character string recognition unit 814 may be embedded in the e-mail message. In this case, embedding of the recognized character string may be executed in accordance with the reliability of recognition upon recognizing the character string. For example, the recognized character string may be embedded in an e-mail message only when its reliability of recognition is at or above 50%.

Figure 18:
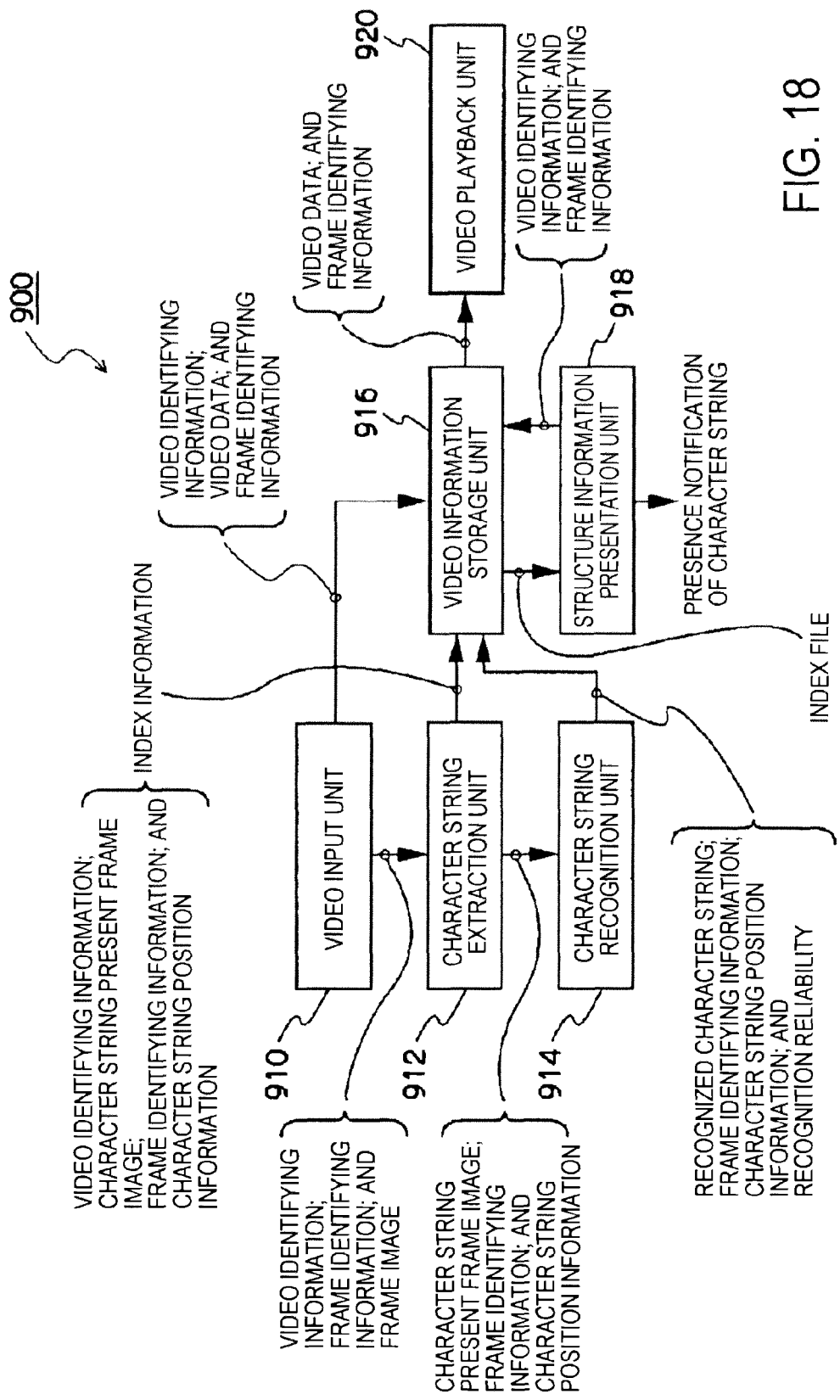
FIG. 18 is a block diagram showing the video structuring device according to a ninth exemplary embodiment.

FIG. 18 shows a video structuring device according to a ninth exemplary embodiment. Video structuring device 900 has the functions of video structuring device 500 shown in FIG. 14 as well as those of video structuring device 700 shown in FIG. 16. Here, video playback unit 920 is configured to be able to display a video starting from a replay point selected by the user on display device 172.

Video input unit 910 of video structuring device 900 has the functions of video input unit 510 of video structuring device 500 shown in FIG. 14 and those of video input unit 710 of video structuring device 700 shown in FIG. 16. Character string extraction unit 912 of video structuring device 900 has the functions of character string extraction unit 512 shown in FIG. 14 and those of character string extraction unit 712 shown in FIG. 16. Character string recognition unit 914 has the functions of character string recognition unit 514 shown in FIG. 14 and those of character string recognition unit 714 shown in FIG. 16. Video information storage unit 916 of video structuring device 900 has the functions of video information storage unit 716 shown in FIG. 16, and structure information presentation unit 918 has the functions of structure information presentation unit 518 shown in FIG. 14 and those of structure information presentation unit 718 shown in FIG. 16.

Structure information presentation unit 918 makes index list display such as shown in FIG. 13 on display device 172 for notification to the user. Upon receipt of information to the effect that a character string is present in a frame image from character string extraction unit 912, structure information presentation unit 918 displays information to the effect that a character string is present in a frame image for notification to the user and also shows new character string display 126 or recognized character string 138 in index list display to update the index list display.

The presence of a character string in a frame image may be notified by audibly providing information on appearance of the character string. Structure information presentation unit 718 may also turn on the power switch of display device 172 when it is determined that a character string is present in a frame image to draw the user's attention.

As information to be notified to the user, the user may be notified of a predefined specific character string. In this case, a character string desired to be used for notification is registered to the recording unit or the like in advance. Upon reception of information to the effect that a character string is present in frame images from character string extraction unit 912, structure information presentation unit 918 retrieves the registered character string from the recording unit and the like and displays the character string on display device 172. Furthermore, the form or contents of a notification to the user that a character string is present in a frame image may be changed in accordance with the reliability of recognition.

Structure information presentation unit 818 may also send an electronic mail message notifying the presence of a character string to a predetermined mail address when it is determined that a character string is present in a frame image. A recognized character string which has been recognized and outputted by character string recognition unit 814 may be embedded in the e-mail message. In this case, embedding of the recognized character string may be executed in accordance with the reliability of recognition upon recognizing the character string.

In this exemplary embodiment, the user can view the index list display shown on display device 172 and designate a replay start point of a video by manipulating input device 170 such as a mouse and a keyboard to select replay point information such as desired character string display 126, recognized character string 138, time of shooting and the like. When the user designates a replay start point of a video by operating input device 170, structure information presentation unit 918 selects video identifying information and frame identifying information corresponding to the replay start point, and outputs them to video information storage unit 916. Upon receipt of the video identifying information and frame identifying information from structure information presentation unit 918, video information storage unit 916 reads out video data corresponding to the obtained video information, and outputs it to video playback unit 920 together with the frame identifying information. When video playback unit 920 is configured to be able to decode a video file to obtain time-series frame images, video information storage unit 916 outputs a video file and frame identifying information to video playback unit 920. In this case, video playback unit 920 decodes the obtained video file and displays frame images starting from the frame identifying information, thereby presenting a video from the replay point to the user. When video playback unit 920 is configured to obtain and display time-series frame images, video information storage unit 916 outputs time-series frame images starting from the frame identifying information to video playback unit 920. In the latter case, video playback unit 920 displays frame images starting from the frame identifying information, thereby presenting the video starting from the replay point to the user.

Also in this exemplary embodiment, as one form of information notification to the user, the user may be notified of the presence of a character string when a predetermined specific character string is present in a video. In this case, upon obtaining a recognized character string from character string recognition unit 912, structure information presentation unit 918 determines whether or not the character string is a character string included in a group of predetermined keywords. If it determines that the recognized character string is a character string included in the predetermined keywords, structure information presentation unit 918 displays information to the effect that the character string is present in the video on display device 172 or outputs sound from an audio output device so as to notify the user that the predetermined character string has appeared.

Since this exemplary embodiment uses a portion of a character string present frame image for character string display 126 which is in the form of an image serving as an index, it has less possibility of a phenomenon in which character string display 126 does not agree with the contents of a video than when only character strings resulting from character recognition are displayed. The user can view the index list display to see the contents of the video and easily locate a specific picture. In addition, since this exemplary embodiment enables control of display method as a function of the reliability of a character string recognition result, the user can select an index with confidence in recognized character strings and search a video with improved efficiency.

The present invention notifies a user of the presence of a character string when videos are sequentially supplied and a character string or a desired character string has appeared in the video. Accordingly, by using the present invention, when it is necessary to monitor the appearance of a specific character string in a video, the user can be promptly notified of the presence of a character string of interest.

While examples of index list display in the present invention are shown in FIGS. 6 and 13, index list display is not limited to these forms.

Figure 19:
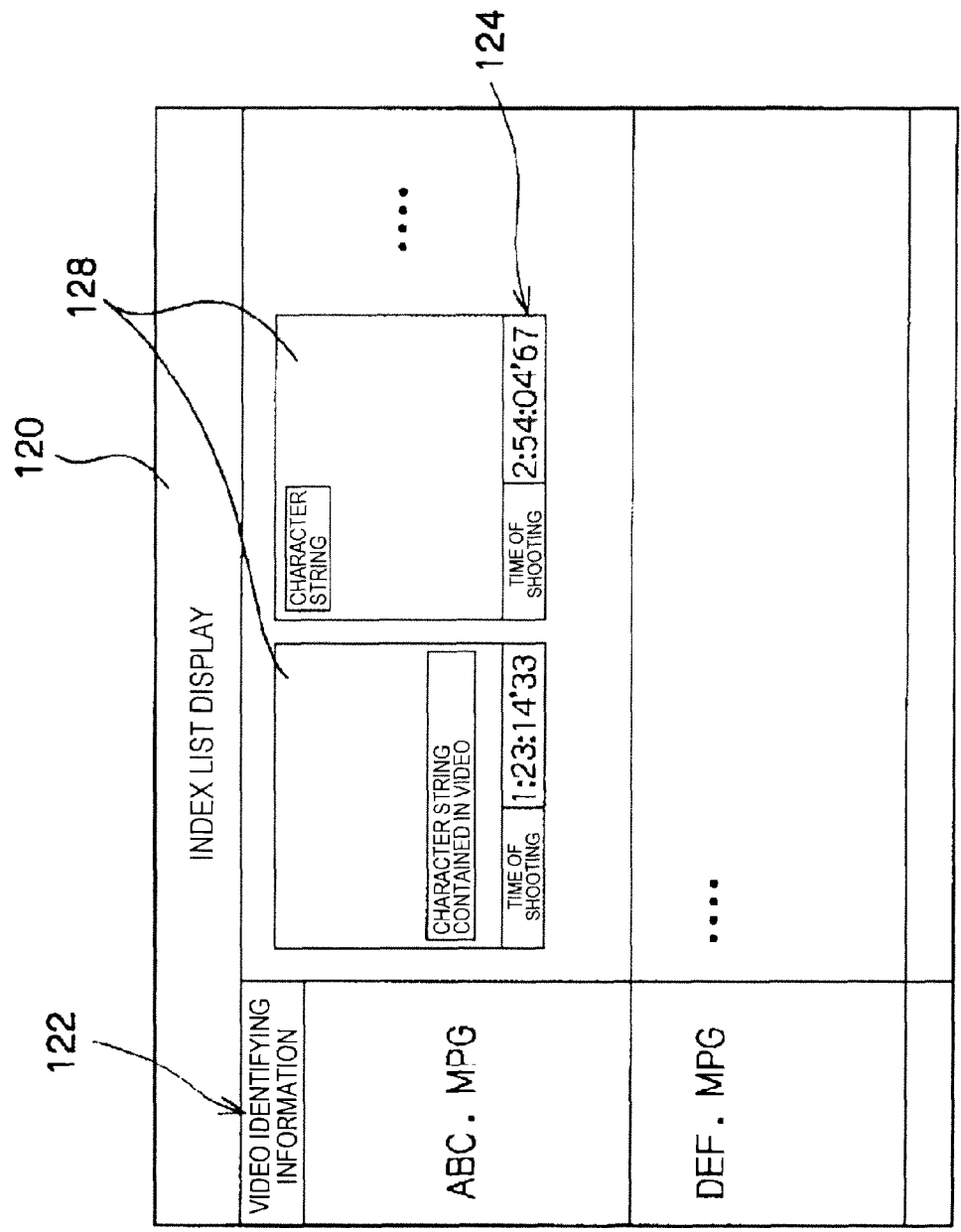
FIG. 19 is a view showing another example of the index list display.

FIG. 19 shows another example of index list display. In the index list displays shown in FIGS. 6 and 13, an area in which a character string is present is cut out from a character string present frame image based on character string position information and character string display in the form of a cut-out image is shown on a display device being associated with frame identifying information; whereas in the index list display shown in FIG. 19, character string present frame image 128 of a reduced size is indicated in the index list display.

FIG. 20 shows yet another example of index list display. While the index list display shown in FIG. 13 displays character string display 126 in the form of an image and recognized character string 138 concurrently, the one shown in FIG. 20 switches between character string display 126 in the form of an image and display in the form of recognized character string 139 depending on the reliability of recognition.

Here, switching between the character string display in the form of an image and display in the form of a recognized character string will be described. The description here illustrates a case where the display method is switched in accordance with reliability of recognition will be described. By way of example, consider a case where threshold value $\Theta 1$ for determining whether or not to display a recognized character string is set to 50%, threshold value $\Theta 3$ for determining whether or not to highlight a recognized character string is to 80%, and threshold value $\Theta 2$ for determining whether or not to display a character string in the form of an image is to 90%.

When such threshold values are set, if the reliability of recognizing a character string "Character string contained in video" is calculated to be 40%, the value of recognition reliability is smaller than $\Theta 1$ (=50%), so that only character string display 126 in the form of an image is displayed and a recognized character string is not displayed for "Character string contained in video" as shown in FIG. 20. If the recognition reliability for a character string "Character string" is calculated to be 95%, the value of the recognition reliability is greater than $\Theta 2$ (90%) and greater than $\Theta 3$ (80%), so that only recognized character string 139 is highlighted and character string display in the form of an image is not displayed for "Character string" as shown in FIG. 20. The highlighting may be display in boldface type or may use a conspicuous color or pattern.

In such a manner, since the display method can be controlled between character string display in the form of an image and display of recognized character strings as a function of the reliability of a character string recognition result, the user can select an index with confidence in recognized character strings and search a video with improved efficiency.

The video structuring devices of the first and third to ninth exemplary embodiments described above can also be realized by installing programs for executing the processes described above in a computer system like the video structuring device of the second exemplary embodiment. Accordingly, the computer programs for realizing the video structuring devices of the first to ninth exemplary embodiments are also encompassed within the scope of the invention.

INDUSTRIAL APPLICABILITY

The present invention facilitates video search and picture location by the user by providing index list display for video search based on the presence of character strings. This invention can be applied to such systems as video recorders, video cameras, and digital still cameras. The invention is also applicable to mobile terminal devices with image taking and receiving capabilities, such as mobile phones, PHS (Personal Handyphone System), personal computers, PDA (Personal Digital Assistants; mobile information communication devices for personal use) all equipped with a camera, and other systems.

The invention claimed is:

1. A video structuring device, comprising:

video input means for receiving a video signal, and outputting a frame image of a video, frame identifying information for identifying the frame image, and video data for said video signal;

character string extraction means for receiving said frame image and said frame identifying information from said video input means to determine whether or not a character string is present in the frame image, and if it determines that a character string is present in the frame image, generating character string position information for the character string present in the frame image as a character string present frame image, and outputting the character string position information, frame identifying information for identifying said character string present frame image and said character string present frame image;

structure information presentation means;

video information storage means for obtaining said frame identifying information, said character string present frame image and said character string position information from said character string extraction means to store them in an index file associated with one another, obtaining said video data and frame identifying information from said video input means to store them being associated with one another, and when said video information storage means obtains said frame identifying information from said structure information presentation means, reading out video data which is recorded being associated with the frame identifying information obtained from the structure information presentation means, and outputting video data starting from a frame image corresponding to the frame identifying information obtained from said structure information presentation means; and video playback means for obtaining video data outputted by said video information storage means and outputting the video data to display means for display, wherein
said structure information presentation means reads out said index file from said video information storage, cuts out an area in which a character string is present from said character string present frame image based on said character string position information, and outputs a character string display in a form of said cut-out image to said display means for display, and when a user enters information for selecting the character string display, said structure information presentation means outputs frame identifying information associated with the selected character string display to said video information storage means.

* * * * *